United States Patent
Ko et al.

(10) Patent No.: US 10,592,052 B2
(45) Date of Patent: Mar. 17, 2020

(54) TOUCH SENSOR

(71) Applicant: Samsung Display Co., Ltd., Yongin-si (KR)

(72) Inventors: Gwang Bum Ko, Yongin-si (KR); Hyun Jae Na, Yongin-si (KR); Hyoung Wook Jang, Yongin-si (KR); Ye Ri Jeong, Yongin-si (KR); Jeong Yun Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/573,461

(22) Filed: Sep. 17, 2019

(65) Prior Publication Data
US 2020/0012384 A1    Jan. 9, 2020

Related U.S. Application Data

(62) Division of application No. 15/603,395, filed on May 23, 2017, now Pat. No. 10,444,900.

(30) Foreign Application Priority Data

May 26, 2016   (KR) .................. 10-2016-0065026

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 2203/04112* (2013.01)

(58) Field of Classification Search
CPC ................... G06F 3/044; G06F 3/0418; G06F 2203/04112
See application file for complete search history.

(56) References Cited

U.S. PATENT DOCUMENTS 8,125,581 B2   2/2012   Kim et al.
8,284,332 B2   10/2012  Geaghan et al.
(Continued)

FOREIGN PATENT DOCUMENTS

KR   10-2010-0138964   12/2010
KR   10-2011-0127236   11/2011
(Continued)

OTHER PUBLICATIONS

Non-Final Office Action dated Feb. 7, 2019, issued in U.S. Appl. No, 15/603,395.

(Continued)

*Primary Examiner* — Ricardo Osorio
(74) *Attorney, Agent, or Firm* — H.C. Park & Associates, PLC

(57) ABSTRACT

A touch sensor includes: a plurality of first sensor electrode columns disposed in a sensing area, the plurality of first sensor electrode columns each including one or more first sensor electrodes; a plurality of second sensor electrode columns alternately disposed with the first sensor electrode columns in the sensing area, the plurality of second sensor electrode columns each including a plurality of second sensor electrodes having a length defined by a longitudinal axis and a width extending in a direction across the length; a plurality of lines connected to the first sensor electrode columns and the second sensor electrode columns; and a pad unit including a plurality of pads connected to the lines, wherein at least some of the second sensor electrodes have a width that varies along the longitudinal axis of its respective second electrodes.

1 Claim, 19 Drawing Sheets

(56) References Cited

U.S. PATENT DOCUMENTS

| | | |
|---|---|---|
| 8,970,515 B2 | 3/2015 | Moran et al. |
| 9,239,654 B2 | 1/2016 | Jang |
| 9,342,178 B2 | 5/2016 | Lee et al. |
| 9,354,755 B2 | 5/2016 | Den Boer et al. |
| 9,588,623 B2 | 3/2017 | Chang |
| 9,740,344 B2 | 8/2017 | Huang et al. |
| 9,836,170 B2 | 12/2017 | Kim et al. |
| 9,927,939 B2 | 3/2018 | Na et al. |
| 10,019,126 B2 | 7/2018 | Lee et al. |
| 10,025,435 B2 | 7/2018 | Chent et al. |
| 10,156,924 B2 | 12/2018 | Xie et al. |
| 2009/0084611 A1 | 4/2009 | Liao et al. |
| 2014/0111709 A1 | 4/2014 | Kim et al. |
| 2014/0333328 A1 | 11/2014 | Nelson et al. |
| 2017/0108965 A1 | 4/2017 | Kim et al. |
| 2017/0228084 A1 | 8/2017 | Kim et al. |
| 2017/0262096 A1 | 9/2017 | Kim et al. |
| 2017/0277346 A1 | 9/2017 | Jeong et al. |
| 2017/0344164 A1 | 11/2017 | Aoki et al. |
| 2017/0344187 A1* | 11/2017 | Ko .................. G06F 3/0418 |

FOREIGN PATENT DOCUMENTS

| | | |
|---|---|---|
| KR | 10-2015-0088273 | 7/2015 |
| KR | 10-2016-0017230 | 2/2016 |

OTHER PUBLICATIONS

Notice of Allowance dated May 28, 2019, issued in U.S. Appl. No. 15/603,395.
Corrected Notice of Allowability dated Jun. 11, 2019, issued in U.S. Appl. No. 15/603,395.

* cited by examiner

TOUCH SENSOR

CROSS-REFERENCE TO RELATED APPLICATION

This application is a Divisional of U.S. patent application Ser. No. 15/603,395, filed on May 23, 2017, and claims priority from and the benefit of Korean Patent Application No. 10-2016-0065026, filed on May 26, 2016, which are hereby incorporated by reference for all purposes as if fully set forth herein.

BACKGROUND

Field

The invention relates generally to a touch sensor, and more particularly, to a touch sensor having a sensing area with improved sensitivity.

Discussion of the Background

A touch sensor is used as one type of information input device to be attached to one surface of a display panel or to be integrally formed with the display panel. A user may input information by pressing or touching a touch sensor while viewing an image implemented on the display panel.

The touch sensor typically includes a plurality of sensor electrodes provided in a sensing area and a plurality of lines connected to the sensor electrodes. Recently, there is interest in ensuring reliable sensitivity across the entire sensing area while reducing manufacturing cost to increase the utilization of the touch sensor.

The above information disclosed in this Background section is only for enhancement of understanding of the background of the inventive concepts, and, therefore, it may contain information that does not form the prior art that is already known in this country to a person of ordinary skill in the art.

SUMMARY

Touch sensors constructed according to the principles of the invention provide a touch sensor having improved sensitivity while reducing manufacturing cost.

According to one aspect of the invention, a touch sensor includes: a plurality of first sensor electrode columns disposed in a sensing area, the plurality of first sensor electrode columns each including one or more first sensor electrodes; a plurality of second sensor electrode columns alternately disposed with the first sensor electrode columns in the sensing area, the plurality of second sensor electrode columns each including a plurality of second sensor electrodes having a length defined by a longitudinal axis and a width extending in a direction across the length; a plurality of lines connected to the first sensor electrode columns and the second sensor electrode columns; and a pad unit including a plurality of pads connected to the lines, wherein at least some of the second sensor electrodes have a width that varies along the longitudinal axis of its respective second electrodes.

At least some of the second sensor electrodes may have at least two discrete widths.

At least some of the second sensor electrodes may have at least three parts, with a width of a first part and/or a width of a second part opposite to the first part being greater than a width of a third part between the first part and the second part.

The sensing area may be divided into a plurality of areas according to distance from the pad unit, and at least one of shape and width of some of the second sensor electrodes varies according to the respective divided areas.

The sensing area may include a first area spaced from the pad unit by a first distance and a second area spaced from the pad unit by a second distance less than the first distance. At least some of second sensor electrodes disposed in the first area may have a first width, and at least some of second sensor electrodes disposed in the second area may have a second width greater than the first width.

At least some of the second sensor electrodes disposed in the second area may have a third width.

The third width may be substantially the same as the second width and the first width may be disposed in a region between the second and third widths and may be smaller than the second width and the third width.

The sensing area may further include a third area spaced from the pad unit by a third distance less than the second distance. At least some of second sensor electrodes disposed in the third area may have a fourth width greater than the second width, and a fifth width smaller than the first width.

Of the second sensor electrodes disposed in the first, second, and third areas, the difference between maximum and minimum widths of the second sensor electrodes disposed in the third area may be largest.

At least some of the second sensor electrodes disposed in the second area may have a minimum width smaller than the first width, and the width of at least some of the second sensor electrodes disposed in the second area may gradually increase progressing from the middle toward the ends of the second sensor electrode.

The first sensor electrode may be spaced from adjacent second sensor electrodes at a predetermined distance along boundary surfaces of the adjacent second sensor electrodes.

Each of the first sensor electrode columns may include N (where N is a natural number of 2 or more) first sensor electrodes arranged in a first direction. Each of the second sensor electrode columns may include N second sensor electrode groups arranged in the first direction adjacent the respective N first sensor electrodes, and each of the N second sensor electrode groups may include K (where K is a natural number of 2 or more) second sensor electrodes having a smaller area than each of the first sensor electrodes.

Of the N first sensor electrodes, at least a first sensor electrode closest to the pad unit may include at least two sub-electrodes.

At least some of the lines may be connected to the pad unit to pass through an area between the at least two sub-electrodes.

Sub-electrodes included in the same first sensor electrode column of the first sensor electrode columns may be connected to the same pad provided in the pad unit.

According to another aspect of the invention, a touch sensor includes: a plurality of first sensor electrode columns disposed in a first direction in a sensing area, the plurality of first sensor electrode columns each including N (N is a natural number of 2 or more) first sensor electrodes; a plurality of second sensor electrode columns alternately disposed with the first sensor electrode columns in the sensing area, the plurality of second sensor electrode columns each including a plurality of second sensor electrodes; a plurality of lines disposed between the first sensor electrode columns and the second sensor electrode columns; and a pad unit including a plurality of pads connected to the lines, wherein each of Nth first sensor electrodes closest to the pad unit among the first sensor electrodes provided in each of the first sensor electrode columns includes at least two sub-electrodes, and at least some of the lines are connected to the pad unit passing through an area between the at least two sub-electrodes.

A width between the first sensor electrode columns and the second sensor electrode columns may be narrowed in an area in which at least the sub-electrodes are disposed.

According to yet another aspect of the invention, a touch sensor includes: a plurality of first sensor electrode columns disposed in a sensing area, the plurality of first sensor electrode columns each including one or more first sensor electrodes; a plurality of second sensor electrode columns alternately disposed with the first sensor electrode columns in the sensing area, the plurality of second sensor electrode columns each including a plurality of second sensor electrodes; a plurality of gray zones located between adjacent the first sensor electrodes and the second sensor electrodes; at least one of dummy patterns disposed in each of the plurality of gray zones; a plurality of lines connected to the first sensor electrode columns and the second sensor electrode columns; and a pad unit including a plurality of pads connected to the lines. The number of the dummy patterns disposed in each of the gray zones may increase as the distance between the gray zone and the pad unit increase.

At least some of the second sensor electrodes may have at least two different widths.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
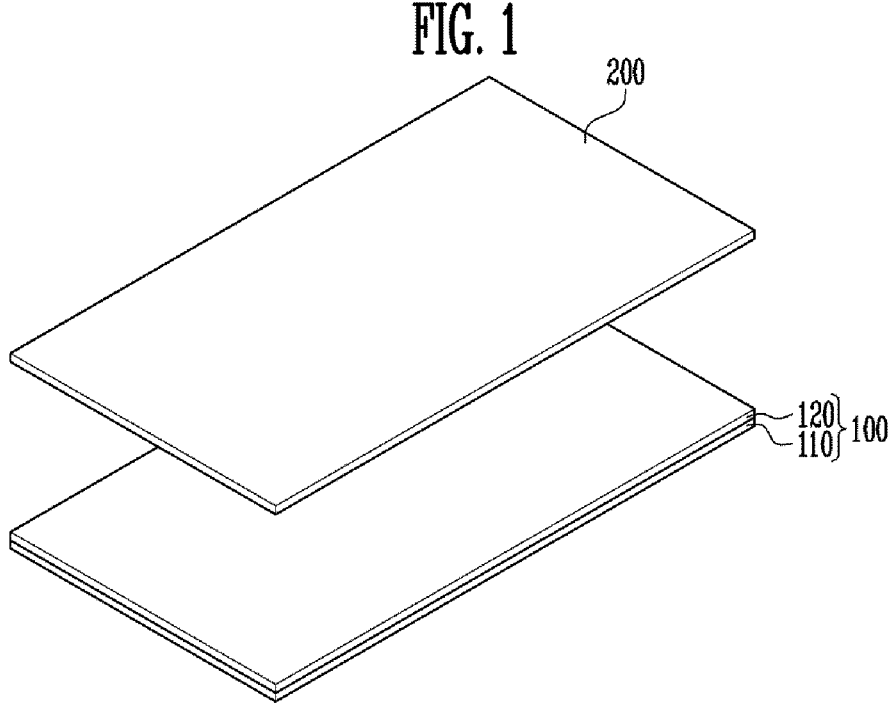
FIG. 1 is an exploded perspective view illustrating an example of the general components of a touch sensor display device.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is an exploded perspective view illustrating an example of the general components of a touch sensor display device. In FIG. 1, a display panel and a touch sensor are illustrated as separate components, but the inventive concepts are not limited thereto. That is, the display panel and the touch sensor may be integrally formed.

Referring to FIG. 1, the touch sensor display device includes a display panel 100 and a touch sensor 200.

The display panel 100 includes a first substrate 110 and a second substrate 120, which face each other. A plurality of pixels (not shown) is provided between the first substrate 110 and the second substrate 120.

The type of the display panel 100 is not particularly important, as long as it can be used for displaying images. For example, the display panel 100 may be a self-luminescent display panel such as an organic light emitting display panel (OLED panel). Alternatively, the display panel 100 may be a non-emissive display panel such as a liquid crystal display panel (LCD panel), an electro-phoretic display panel (EPD panel), or an electro-wetting display panel (EWD panel). When the display panel 100 is a non-emissive display panel, the touch sensor display device may include a back-light unit for supplying light to the display panel 100.

The touch sensor 200 is disposed on one surface of the display panel 100 to receive a touch input of a user. For example, the touch sensor 200 may be disposed on one of the surfaces of the display panel in a direction on which an image is displayed.

In addition, the touch sensor 200 may be integrally formed with the display panel 100. For example, the touch sensor 200 may be formed on at least one of the first substrate 110 and the second substrate 120, which constitute the display panel 100.

Figure 2:
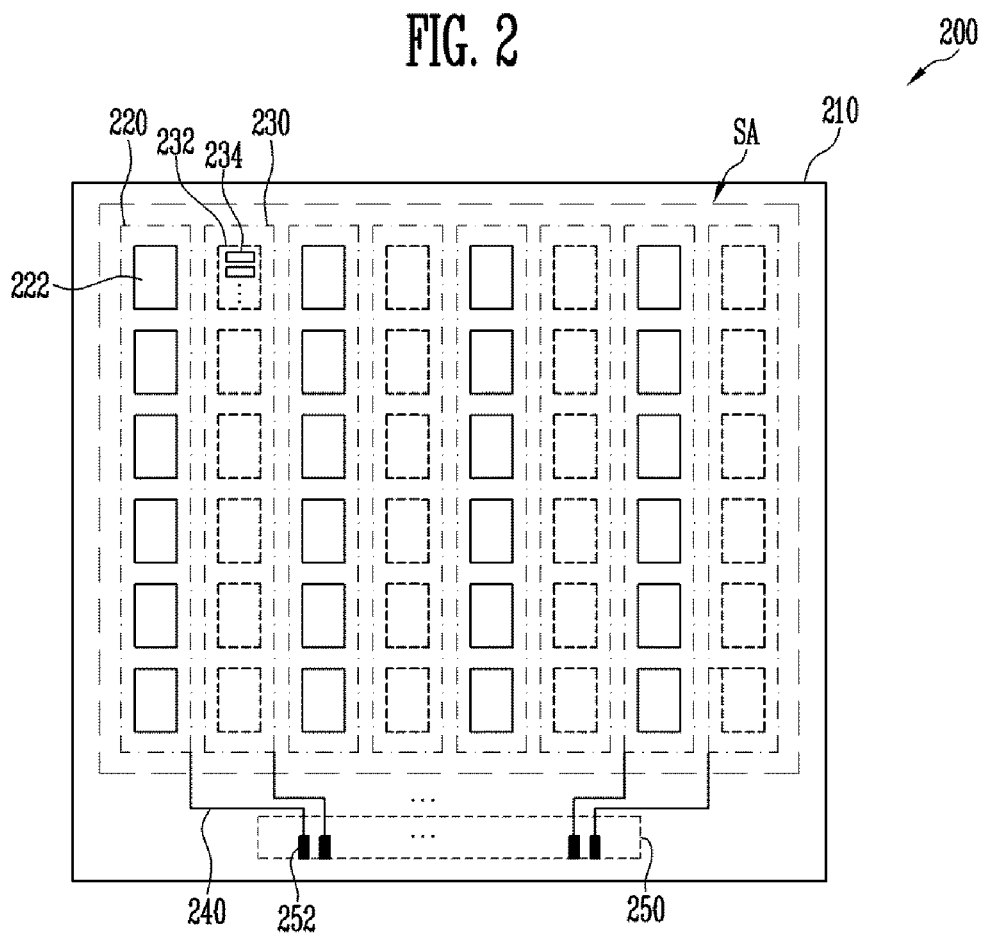
FIG. 2 is a plan view schematically illustrating a touch sensor constructed according to the principles of the invention.

FIG. 2 is a plan view schematically illustrating a touch sensor constructed according to the principles of the invention. In some embodiments, a one-layer type touch sensor in which first and second sensor electrode columns are alternately disposed in units of columns is illustrated in FIG. 2. However, the inventive concepts are not limited thereto, and the arrangement of the first and second sensor electrode columns constituting the touch sensor may be variously modified and embodied.

Referring to FIG. 2, the touch sensor 200 constructed according to the principles of the invention includes a substrate 210, a plurality of first sensor electrode columns 220 and a plurality of second sensor electrode columns 230, which are disposed in a sensing area SA on the substrate 210, a plurality of lines 240 connected to the first and second sensor electrode columns 220 and 230, and a pad unit 250 connected to the lines 240.

The substrate 210 may be, for example, an insulating substrate made of a transparent material. For example, the substrate 210 may be a flexible substrate including at least one material selected from polyethersulfone (PES), polyacrylate, polyetherimide (PEI), polyethylene naphthalate (PEN), polyethylene terephthalate (PET), polyphenylene sulfide (PPS), polyarylate (PAR), polyimide (PI), polycarbonate (PC), cellulose triacetate (TAC), and cellulose acetate propionate (CAP). Also, the substrate 210 may be a rigid substrate including one material selected from glass or tempered glass.

In one or more exemplary embodiments, the substrate 210 may be one of the first substrate 110 and the second substrate 120 of the display panel 100 shown in FIG. 1. In this case, the touch sensor 200 may be implemented as a display embedded touch sensor that is integrally formed with the display panel 100. In other exemplary embodiments, the substrate 210 may be a base substrate of a polarizing plate (not shown) provided in the display panel 100 or a window substrate provided in the display device. In still other embodiments, the substrate 210 may be a separate substrate for the touch sensor.

The first sensor electrode columns 220 and the second sensor electrode columns 230 may be alternately disposed in the sensing area SA. For example, the first sensor electrode columns 220 may be disposed at odd-numbered columns, and the second sensor electrode columns 230 may be disposed at even-numbered columns. However, the order or direction in which the first and second sensor electrode columns 220 and 230 are disposed may be variously modified and embodied as is known in the art. That is, in some embodiments, the configuration of the first and second sensor electrode columns 220 and 230 may be variously changed.

In one or more exemplary embodiments, each of the first sensor electrode columns 220 may include one or more first sensor electrodes 222 including a conductive material. For example, each of the first sensor electrode columns 220 may include N (N is a natural number of 2 or more) first sensor electrodes 222 arranged in a first direction (e.g., the column direction). For convenience, it has been illustrated in FIG. 2 that each of the first sensor electrode columns 220 includes six first sensor electrodes 222. However, the number of first sensor electrodes 222 provided in each of the first sensor electrode columns 220 may be variously modified and embodied.

Each of the second sensor electrode columns 230 may include a plurality of second sensor electrode groups 232 including a conductive material. For example, when each of the first sensor electrode columns 220 includes N first sensor electrodes 222, each of the second sensor electrode columns 230 may include N second sensor electrode groups 232 arranged in the first direction (e.g., the column direction) adjacent to the respective N first sensor electrodes 222. For example, when each of the first sensor electrode columns 220 includes six first sensor electrodes 222, each of the second sensor electrode columns 230 may include six second sensor electrode groups 232.

In one or more exemplary embodiments, each of the second sensor electrode groups 232 may be configured to include a plurality of, i.e., K (K is a natural number of 2 or more) second sensor electrodes 234 to have a smaller area than the first sensor electrodes 222. For example, each of the first sensor electrodes 222 may be formed as a single, rectangular plate shape and each of the second sensor electrode groups 232 may include five second sensor electrodes 234. The number of second sensor electrodes 234 provided in each of the second sensor electrode group 232 may be variously modified and embodied.

In one or more exemplary embodiments, the touch sensor 200 may be a mutual-capacitive type touch sensor. In this case, one of the first and second sensor electrodes 222 and 234 may be a driving electrode (Tx electrode) that receives a touch driving signal, and the other of the first and second sensor electrodes 222 and 234 may be a sensing electrode (Rx electrode) that outputs a sensing signal corresponding to the touch driving signal.

A capacitance is formed between adjacent first and second sensor electrodes 222 and 234, as is known in the art. When a touch input of a specific object such as a user's body or a stylus pen occurs, the touch input causes a change in capacitance between first and second sensor electrodes 222 and 234 disposed in a corresponding area and/or a proximity area. The change in capacitance is detected, so that the touch input can be detected.

The touch sensor 200 is not necessarily limited to the mutual-capacitive type touch sensor. For example, sensor electrode structures described in the following embodiments for improving sensitivity may also be applied to a self-capacitive type touch sensor.

In one or more exemplary embodiments, the first sensor electrodes 222 and the second sensor electrodes 234 are arranged substantially in parallel to each other along the column direction or row direction, but the inventive concepts are not necessarily limited thereto. For example, the first sensor electrodes 222 and the second sensor electrodes 234 may be disposed to intersect each other.

In this exemplary embodiment, the first sensor electrode columns 220 and the second sensor electrode column 230 are configured to include a plurality of first sensor electrodes 222 and a plurality of second sensor electrodes 234, respectively, but the inventive concepts are not necessarily limited thereto. For example, at least one of the first sensor electrode column 220 and the second sensor electrode column 230 may be configured as one sensor electrode extending lengthwise along the column direction.

That is, the number of first sensor electrodes 222, which are disposed on the first sensor electrode columns 220 and/or second sensor electrodes 234, which are disposed on the second sensor electrode columns 230, may be variously changed. For example, the number of first sensor electrodes 222, which are disposed on the first sensor electrode columns 220 and/or second sensor electrodes 234, which are disposed on the second sensor electrode columns 230, may be set such that the number of lines 240 can be minimized within a range satisfying a predetermined touch sensor resolution (e.g., sensitivity).

The lines 240 electrically connect the first sensor electrodes 222 and the second sensor electrodes 234 to the pad unit 250. For convenience, it has been illustrated in FIG. 2 that one line 240 is connected for each of the first and second sensor electrode columns 220 and 230. However, a plurality of lines 240 corresponding to the number of first or second sensor electrodes 222 or 234 included in each of the first and second sensor electrode columns 220 and 230 may be connected to each of the first and second sensor electrode columns 220 and 230. In addition, the plurality of lines 240 may be connected to different pads 252 provided in the pad unit 250.

The pad unit 250 includes a plurality of pads 252 connected to the first or second sensor electrodes 222 or 234 through the lines 240. The pad unit 250 is connected to a driving circuit for driving the touch sensor 200, e.g., a touch IC. Various signals required to drive the touch sensor are transmitted/received through the pad unit 250 as is known in the art.

Figure 3:
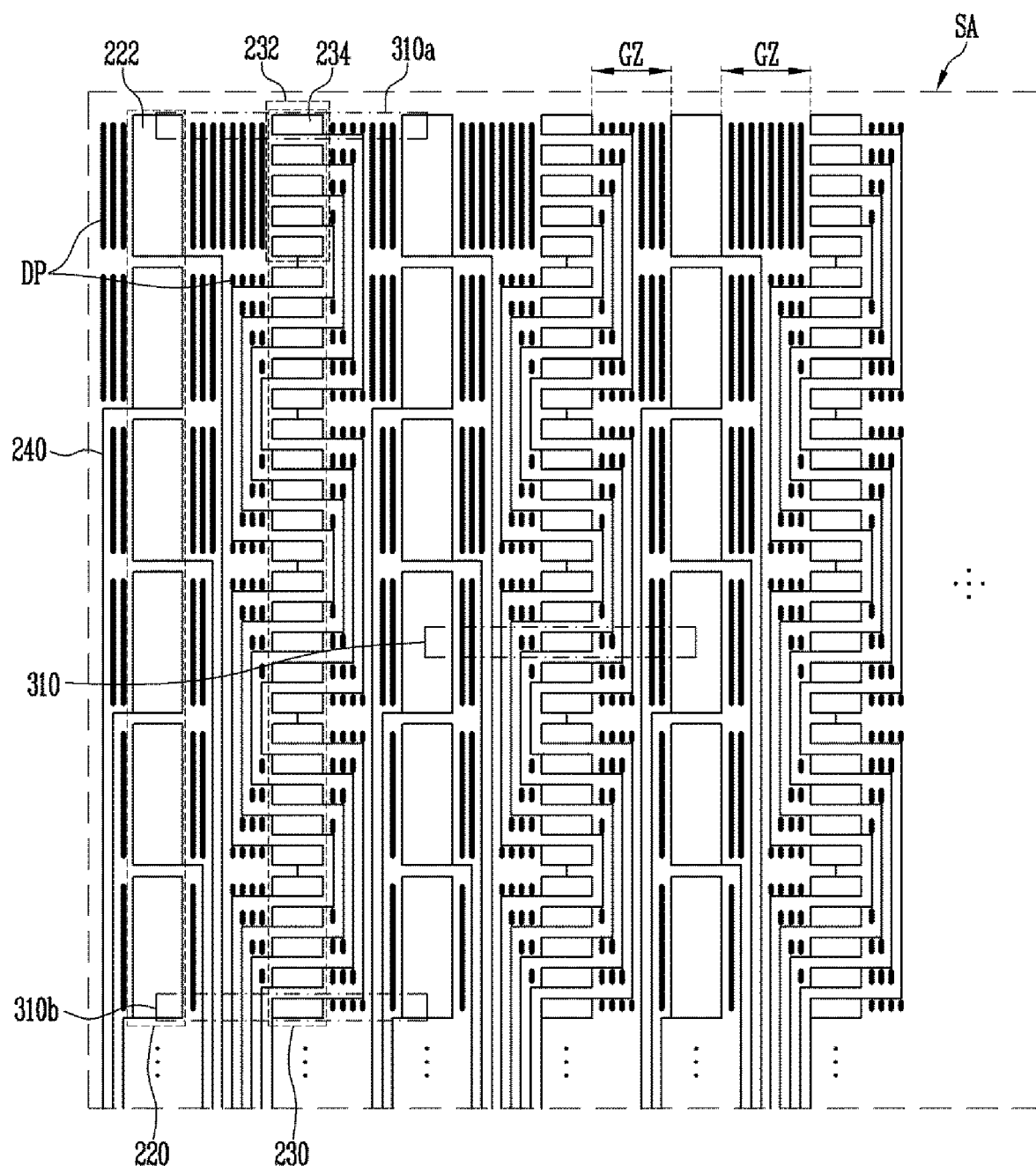
FIG. 3 is a partial, enlarged plan view illustrating the sensing area of the touch sensor of FIG. 2.
Figure 4:
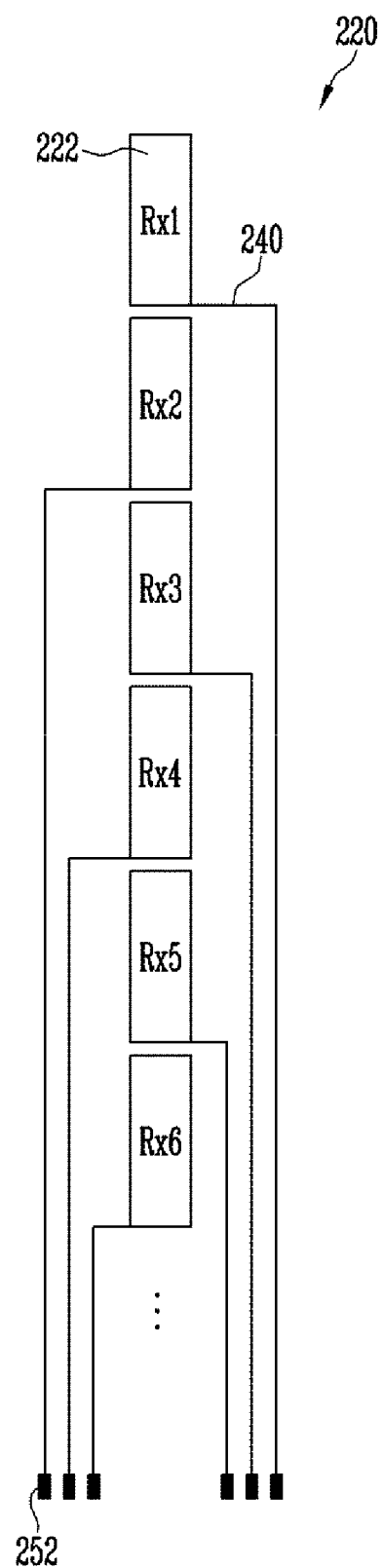
FIG. 4 is a plan view schematically illustrating an exemplary configuration of a first sensor electrode column and lines connected thereto, which are shown in FIG. 3.
Figure 5:
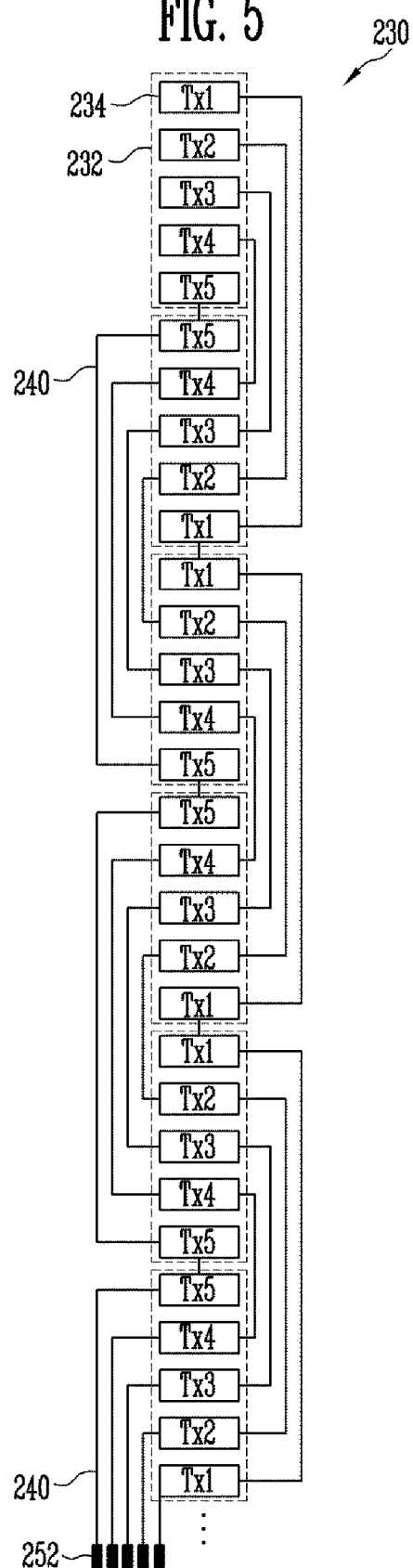
FIG. 5 is a plan view schematically illustrating an exemplary configuration of a second sensor electrode column and lines connected thereto, which are shown in FIG. 3.

FIG. 3 is a partial, enlarged plan view illustrating the sensing area of the touch sensor of FIG. 2. FIG. 4 is a plan view schematically illustrating an exemplary configuration of a first sensor electrode column and lines connected thereto, which are shown in FIG. 3. FIG. 5 is a plan view schematically illustrating an exemplary configuration of a second sensor electrode column and lines connected thereto, which are shown in FIG. 3. According to one or more exemplary embodiments, FIGS. 3, 4 and 5 illustrate a touch sensor in which a plurality of first or second sensor electrodes are disposed in each sensor electrode column, and the second sensor electrodes are divided to have a number larger than that of the first sensor electrodes. However, the inventive concepts are not limited thereto. That is, the size, number, arrangement direction, and/or arrangement structure of the first sensor electrodes and/or second sensor electrodes may be variously modified and embodied.

Referring to FIGS. 3, 4, and 5, each first sensor electrode column 220 may include a plurality of first sensor electrodes Rx1 to Rx6 (222) arranged along the direction in which the first sensor electrode columns 220 extend, e.g., the column direction. For convenience, in this embodiment, it is assumed that six first sensor electrodes Rx1 to Rx6 (222) are provided in each of the first sensor electrode columns 220, but this may be changed. For example, one or more first sensor electrodes 222 may be formed in each of the first sensor electrode columns 220.

A line 240 is connected between each of the first sensor electrodes Rx1 to Rx6 (222) and a corresponding pad 252. The lines 240 may be routed to extend from each one of the ends of the first sensor electrodes Rx1 to Rx6 (222), respectively. Particularly, as shown in these figures, the lines 240 may be routed to extend alternately from the left and right sides of the ends of the first sensor electrodes Rx1 to Rx6 (222), respectively.

In one or more exemplary embodiments, each second sensor electrode column 230 includes a plurality of second sensor electrode groups 232 arranged along the direction in which the second sensor electrode columns 230 extend, e.g., the column direction. In addition, each of the second sensor electrode groups 232 may include a plurality of second sensor electrodes Tx1 to Tx5 (234). For convenience, in this embodiment, it is assumed that six second sensor electrode groups 232 are provided in each of the second sensor electrode columns 230, and five second sensor electrodes 234 are provided in each of the second sensor electrode groups 232. However, this may be variously changed.

In one or more exemplary embodiments, i-ary second sensor electrodes Txi (where i is a natural number) included in the respective second sensor electrode groups 232 may be electrically connected to each other. For example, primary second sensor electrodes Tx1 of the respective sensor electrode groups 232 may be electrically connected to each other, secondary second sensor electrodes Tx2 of the respective sensor electrode groups 232 may be electrically connected to each other, tertiary second sensor electrode groups Tx3 of the respective sensor electrode groups 232 may be electrically connected to each other, and so forth for all five sets of second sensor electrodes.

In one or more exemplary embodiments, the direction in which the primary to quinternary second sensor electrodes Tx1 to Tx5 are sequentially arranged in units of the second sensor electrode groups 232 may be changed. For example, the primary to quinternary second sensor electrodes Tx1 to Tx5 may be sequentially arranged in a direction from the top to the bottom within second electrode groups 232 on odd-numbered rows, corresponding to first sensor electrodes Rx1, Rx3, and Rx5 on the odd-numbered rows. In addition, the primary to quinternary second sensor electrodes Tx1 to Tx5 may be sequentially arranged in a direction from the bottom to the top within second electrode groups 232 on even-numbered rows, corresponding to first sensor electrodes Rx2, Rx4, and Rx6 on the even-numbered rows.

The i-ary second sensor electrodes Txi of the respective sensor electrode groups 232 may be electrically connected to each other in the form of a linked chain. However, the inventive concepts are not limited thereto. That is, the arrangement or connection structure of the second sensor electrodes Tx1 to Tx5 (234) may be variously modified and embodied.

A line 240 is connected between each of the i-ary second sensor electrodes Txi (234) and a corresponding pad 252. The line 240 may be routed to extend from at least one end of each of the i-ary second sensor electrodes Txi (234).

In the above-described embodiment, as shown in FIG. 3, a unit sensor 310 may be constituted from a combination of one second sensor electrode 234 and one or more first sensor electrodes 222 adjacent thereto. For example, one second sensor electrode 234 and a least one area of each of two first sensor electrodes 222 disposed adjacent to left and right sides of the second sensor electrode 234 may constitute one unit sensor 310. Alternatively, one second sensor electrode 234 and at least one area of one first sensor electrode 222 disposed adjacent to the left or right side of the second sensor electrode 234 may constitute one unit sensor 310.

The number of lines 240 disposed in a gray zone GZ that is an area between adjacent first sensor electrodes Rx1 to Rx6 (222) and second sensor electrodes Tx1 to Tx5 (234) may be changed depending on positions in the sensing area SA. For example, the number of lines 240 disposed in a gray zone GZ of a first unit sensor 310a located in an area (e.g., a far end) distant from the pad unit 250 may be smaller than the number of lines 240 disposed in a gray zone GZ of a second unit sensor 310b located in an area (e.g., a near end) close to the pad unit (250 of FIG. 2). However, as shown in FIG. 3, if the first sensor electrodes Rx1 to Rx6 (222) and second sensor electrodes Tx1 to Tx5 (234) are spaced at a constant distance from each other in the sensing area SA, the gray zone has a constant width regardless of the distance from the pad unit 250. Therefore, the number of lines 240 in the gray zone GZ varies along the column direction in the entire sensing area SA. When the lines 240 are unequally distributed in the gray zone GZ as described above, the entire sensing area SA may be unequally balanced.

Accordingly, in one or more exemplary embodiments constructed according to the principles of the invention, floating dummy patterns DP are disposed in the gray zone GZ, so that the sensing area SA can be equally balanced. In other words, as shown in FIG. 3, the number of dummy patterns DP disposed in a gray zone GZ of a second unit sensor 310b located in an area (e.g., a near end) close to the pad unit (250 of FIG. 2) is less than the number of dummy patterns DP disposed in a gray zone GZ of a first unit sensor 310a located in an area (e.g., a far end) distant from the pad unit 250. However, the inventive concepts are not limited thereto. That is, in one or more exemplary embodiments, the dummy patterns DP may be omitted.

The first sensor electrodes Rx1 to Rx6 (222) and second sensor electrodes Tx1 to Tx5 (234) and/or the lines 240 connected thereto may be disposed in the same layer because they do not intersect each other. Accordingly, a one-layer type touch sensor can be implemented. If at least the first sensor electrodes Rx1 to Rx6 (222) and second sensor electrodes Tx1 to Tx5 (234) are disposed in the same layer as described above, the manufacturing process for the touch sensor 200 can be simplified, and manufacturing costs can be reduced.

In addition, a combination of the first sensor electrodes Rx1 to Rx6 (222) and second sensor electrodes Tx1 to Tx5 (234) may be configured to decrease the number of first sensor electrodes Rx1 to Rx6 (222) and second sensor electrodes Tx1 to Tx5 (234) and lines 240. For example, each of the first sensor electrode columns 220 may be configured to include a plurality of first sensor electrodes Rx1 to Rx6 (222), and five second sensor electrodes Tx1 to Tx5 (234) provided per each of the first sensor electrode Rx1 to Rx6 (222) are matched to be adjacent to the first sensor electrode 222, so a combination of the first sensor electrodes Rx1 to Rx6 (222) and second sensor electrodes Rx1 to Rx6 (234) can be configured. Thus, the number of first sensor electrodes Rx1 to Rx6 (222) and second sensor electrodes Rx1 to Rx6 (234) can be minimized within a range satisfying a predetermined touch sensor resolution, thereby effectively decreasing the number of lines 240. Accordingly, the area of the gray zone GZ in which the lines 240 are disposed can be minimized, thereby improving touch sensitivity.

Figure 6:
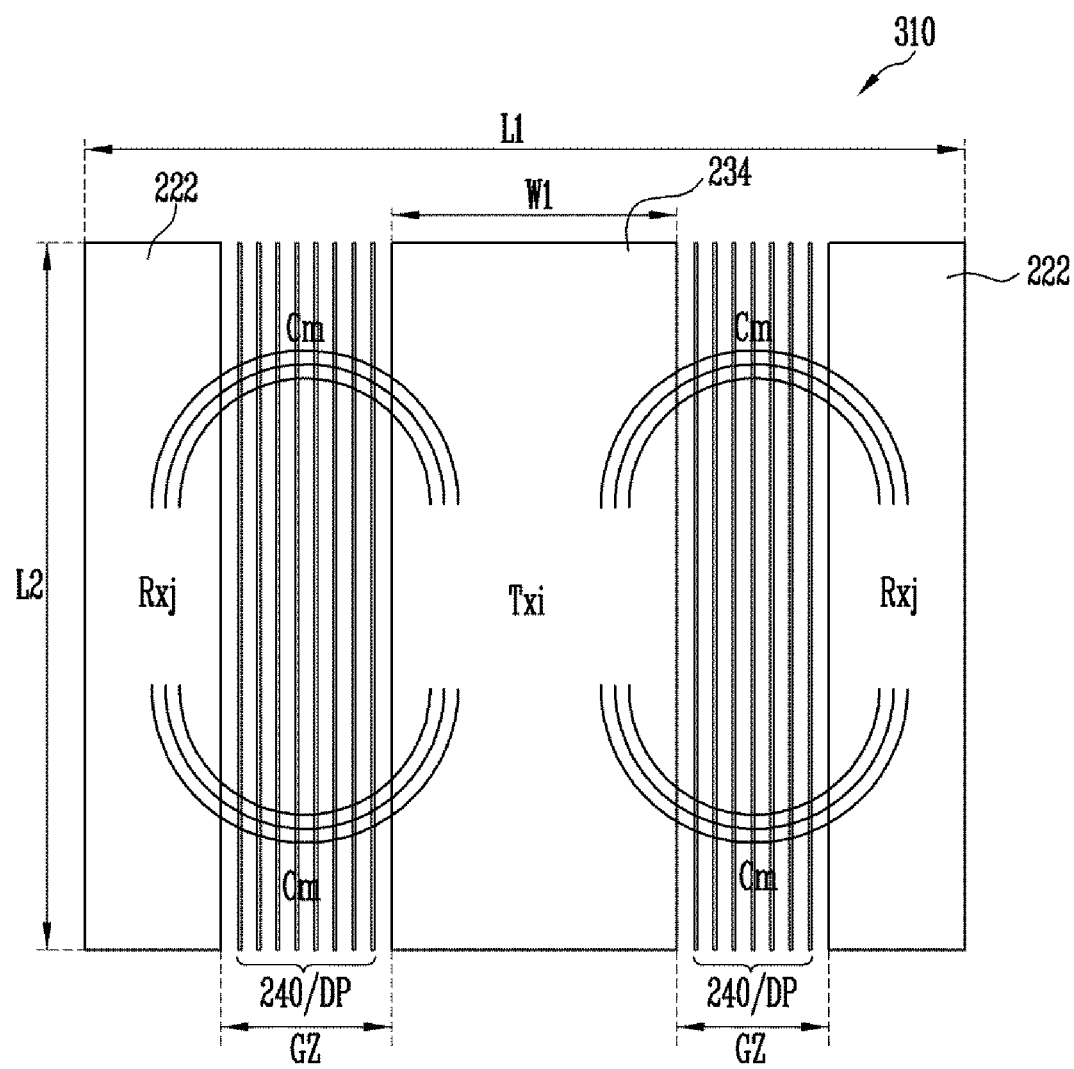
FIG. 6 is a plan view illustrating a unit sensor constructed according to the principles of the invention.
Figure 7A:
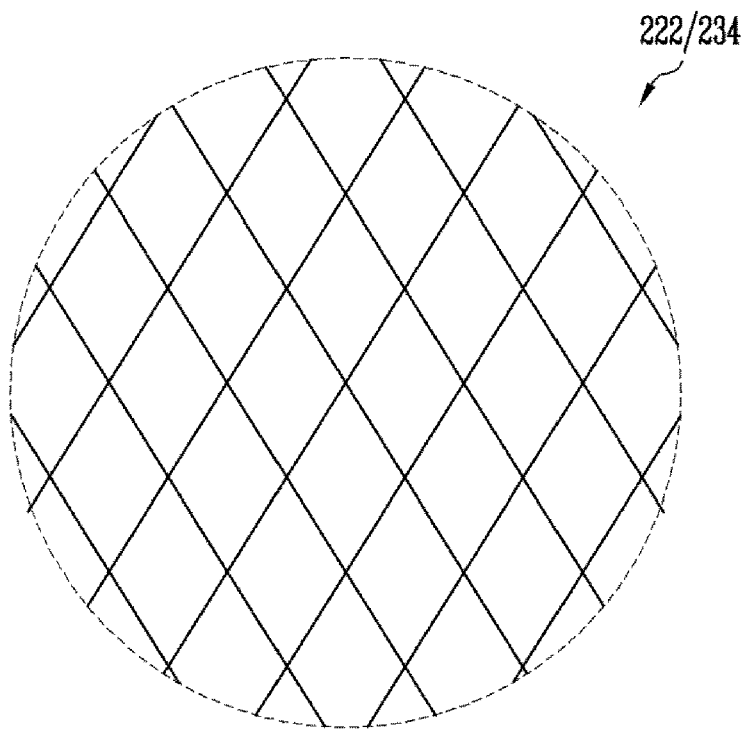
FIGS. 7A, 7B, and 7C are plan views illustrating various exemplary embodiments of conductive layers constituting each sensor electrode that may be used in touch sensor according to the principles of the invention.
Figure 7B:
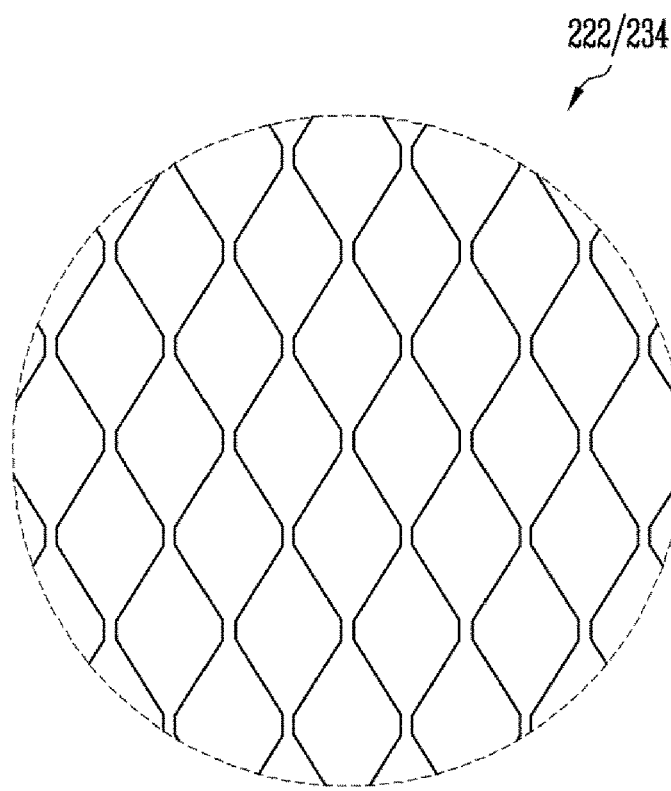
Figure 7C:
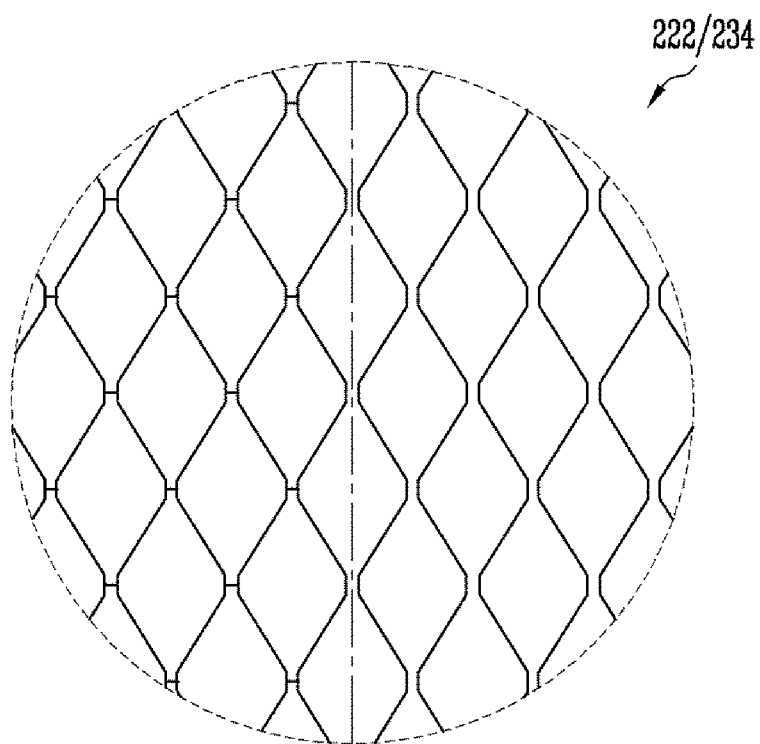

FIG. 6 is a plan view illustrating a unit sensor constructed according to the principles of the invention. FIGS. 7A, 7B, and 7C are plan views illustrating various exemplary embodiments of conductive layers constituting each sensor electrode that may be used in touch sensor according to the principles of the invention.

Referring to FIG. 6, each unit sensor 310 is configured as a combination of one second sensor electrode Txi (i is the number order in which the corresponding second sensor electrode 234 is disposed in each second sensor electrode group 232) and two first sensor electrodes Rxj (j is the number order in which the corresponding first sensor electrode 222 is disposed in each first sensor electrode column 220) adjacent to the left and right sides of the second sensor electrode Txi 234.

A capacitance Cm exists between adjacent first sensor electrode Rxj (222) and second sensor electrode Txi (234). When a touch input occurs, the magnitude of a capacitance Cm between the first sensor electrode Rxj (222) and the second sensor electrode Txi (234) disposed in a corresponding area is changed, and the touch input is detected by detecting such a change in capacitance. As the magnitude of the capacitance Cm between the first sensor electrode Rxj (222) and the second sensor electrode Txi (234) increases, the variation in capacitance Cm of a touch input increases, and accordingly, touch sensitivity is improved.

Each of the first and second sensor electrodes Rxj and Txi (222 and 234) may be electrically connected to at least one of lines 240 disposed in a neighboring gray zone GZ. However, the number of lines 240 and/or the number of dummy patterns DP, which are disposed in a gray zone GZ within a unit sensor 310, and the number of lines 240 to which the unit sensor 310 is connected may be changed depending on the position of the unit sensor 310. Therefore, for convenience and clarity, the part connected between each unit sensor 310 and a line 240 is omitted from FIG. 6.

In one or more exemplary embodiments, a lateral length L1 and a longitudinal length L2 of each unit sensor 310 may be substantially equal or similar to each other. For example, both of the lateral length L1 and the longitudinal length L2 of each unit sensor 310 may be set to 4 mm. Meanwhile, FIG. 3 illustrates that each unit sensor 310 is formed in a rectangular shape that is laterally long. However, this is provided for convenience of illustration, and the shape of each unit sensor 310, the ratio of lateral and longitudinal lengths L1 and L2 of the unit sensor 310, and/or the width of a gray zone GZ may be variously changed.

In one or more exemplary embodiments, areas of the first sensor electrodes Rxj (222) and the second sensor electrode Txi (234), which constitute each unit sensor 310, may be similar or substantially equal to each other. For example, when a second sensor electrode Txi (234) having a first width W1 and at least one area of each of two first sensor electrodes Rxj (222) neighboring the second sensor electrode Txi (234) constitute each unit sensor 310, the unit sensor 310 may include only a partial area having a width corresponding to about a half of the first width W1 in each of the two first sensor electrodes Rxj (222).

While the first sensor electrode Rxj (222) and the second sensor electrode Rxj and Txi (222 and 234) are formed as a polygonal surface pattern in FIG. 6, the inventive concepts are not limited thereto. For example, at least one of the first sensor electrode Rxj (222) and second sensor electrode Txi (234) may be formed as a mesh pattern.

For example, at least one of the first sensor electrode Rxj (222) and the second sensor electrode Txi (234) may be formed as a polygonal mesh pattern as shown in FIG. 7A or a separated, polygonal mesh pattern as shown in FIG. 7B. Alternatively, in order to improve reflective visibility, at least one of the first sensor electrode Rxj (222) and the second sensor electrode Txi (234) may be formed in a configuration in which polygonal mesh patterns having different shapes are mixed as shown in FIG. 7C. Meanwhile, it will be apparent that, in addition to the mesh patterns as shown in FIGS. 7A to 7C, various types of mesh patterns may be applied to at least one of the first sensor electrode Rxj (222) and the second sensor electrode Txi (234).

Figure 8A:
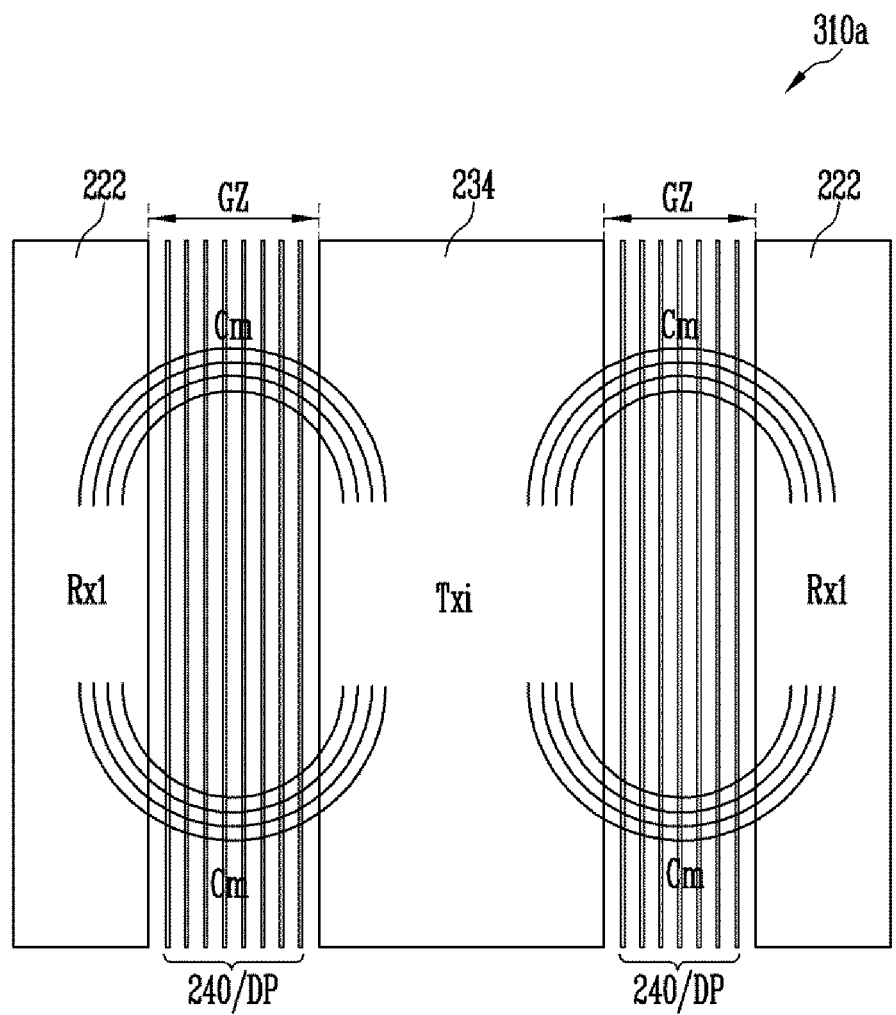
FIGS. 8A and 8B are plan views of upper and lower portions of unit sensors illustrating that the magnitudes of capacitances formed between adjacent sensor electrodes may vary depending on the distance from a pad unit.
Figure 8B:
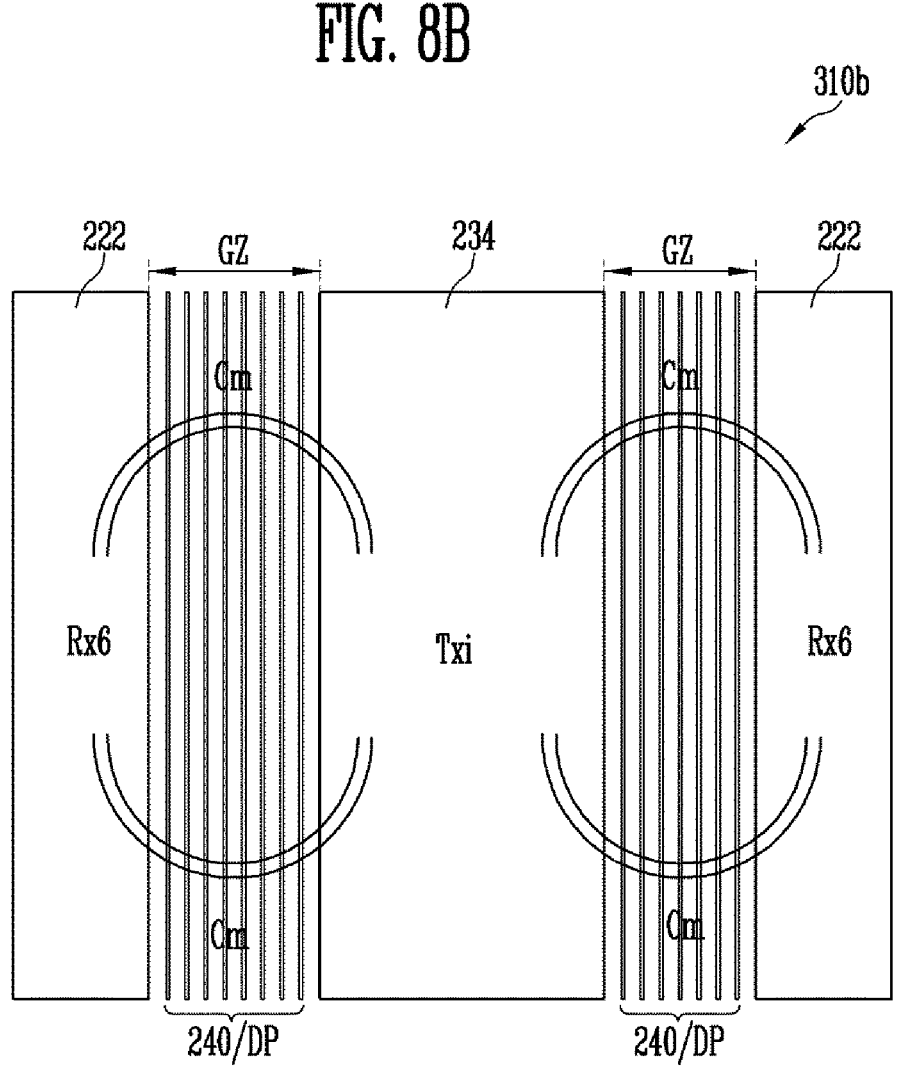

FIGS. 8A and 8B are plan views of upper and lower portions of unit sensors illustrating that the magnitudes of capacitances formed between adjacent sensor electrodes may vary depending on the distance from a pad unit. Particularly, FIG. 8A is a view illustrating the magnitude of a capacitance formed between adjacent first and second sensor electrodes in an area (e.g., a far end) distant from the pad unit, and FIG. 8B is a view illustrating the magnitude of a capacitance formed between adjacent first and second sensor electrodes in an area (e.g., a near end) close to the pad unit.

Referring to FIGS. 8A and 8B together with FIG. 3, in first unit sensor 310*a* configured with, for example, a primary first sensor electrode Rx1 (222) most distant from the pad unit 250 of the first sensor electrodes 222 provided in each of the first sensor electrode columns 220 (as shown in FIG. 3) and a second sensor electrode Txi (234) adjacent the first sensor electrode Rx1 (222), a relatively small number of lines 240 are disposed in the gray zone GZ, and therefore, dummy patterns DP are disposed in an available space.

On the other hand, in second unit sensor 310*b* configured with, for example, the last first sensor electrode Rx6 (222) closest from the pad unit 250 of the first sensor electrodes 222 provided in each of the first sensor electrode columns 220 (as shown in FIG. 3) and a second sensor electrode Txi (234) adjacent the first sensor electrode Rx6 (222), a relatively large number of lines 240 are disposed in the gray zone GZ.

Thus, a relatively large capacitance Cm is formed between the first sensor electrode Rxj (222) and the second sensor electrode Txi (234) of the first unit sensor 310*a* due to a relatively large number of dummy patterns DP, and a relatively small capacitance Cm is formed between the first sensor electrode Rxj (222) and the second sensor electrode Txi (234) of the second unit sensor 310*b* due to a relatively small number of dummy pattern DP.

That is, the magnitude of capacitance Cm to be used in detection of a touch input decreases in a direction progressing from an area distant to the pad unit 250 to an area close to the pad unit 250. The decrease in capacitance Cm may be one of factors that cause degradation of touch sensitivity.

Meanwhile, regardless of the distance from the pad unit 250, variation in capacitance corresponding to a touch input may be changed depending on a position at which the touch input occurs. This will be described with reference to FIGS. 9A and 9B.

Figure 9A:
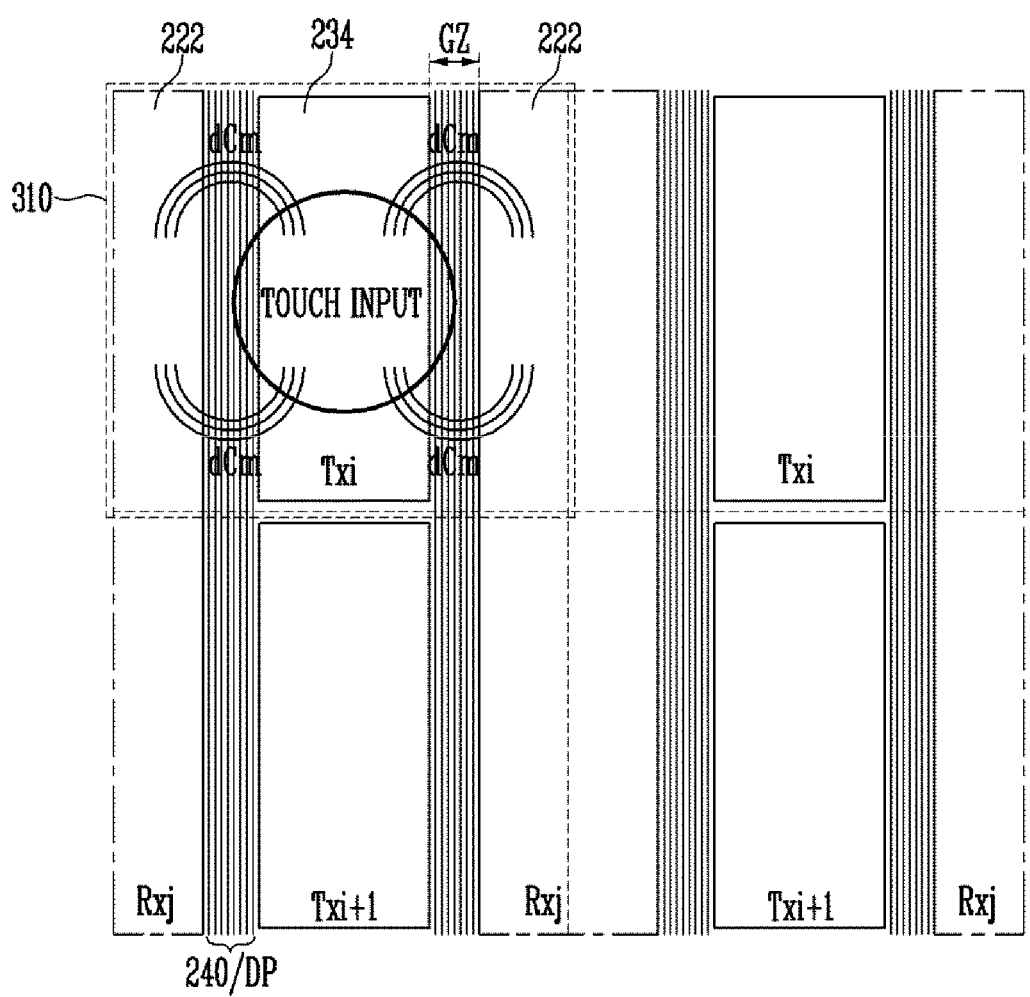
FIGS. 9A and 9B are plan views of unit sensors illustrating that a variation in capacitance may be changed depending on the position at which a touch input occurs.
Figure 9B:
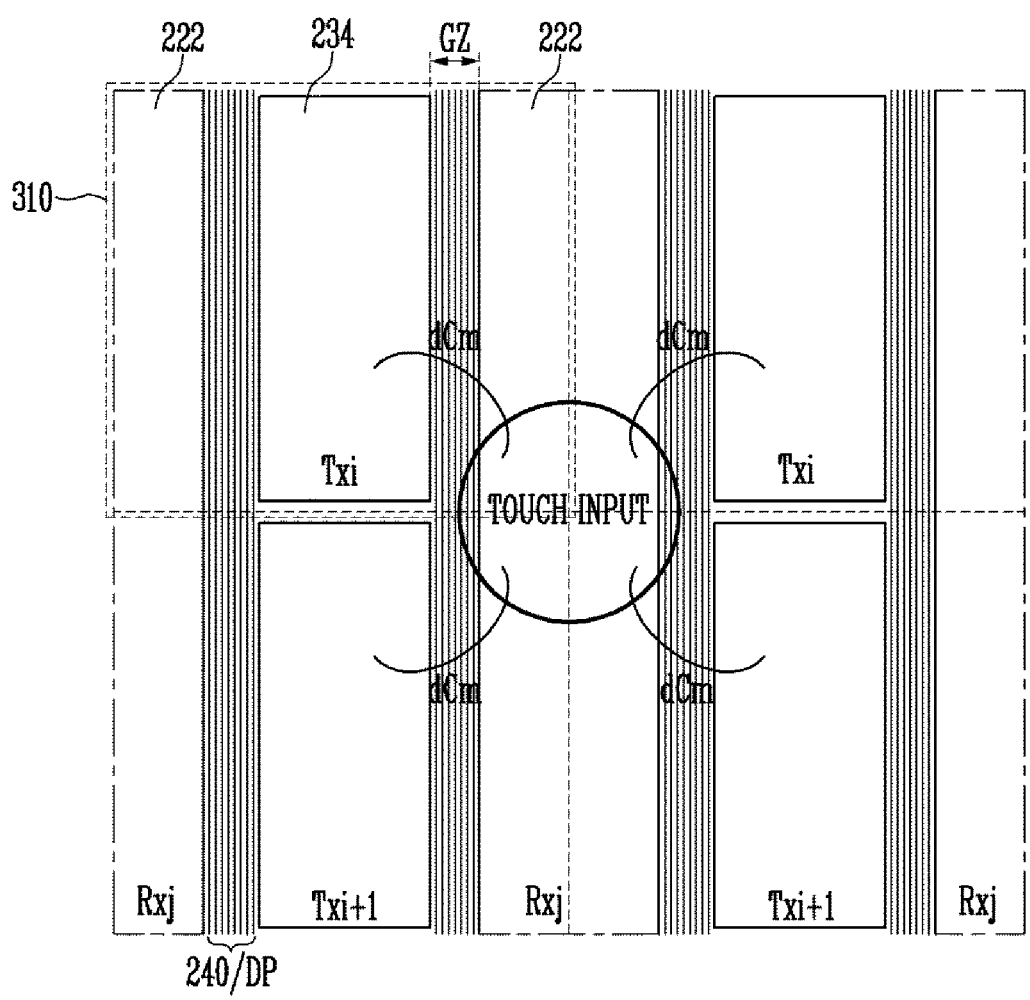

FIGS. 9A and 9B are plan views of unit sensors illustrating that a variation in capacitance may be changed depending on the position at which a touch input occurs. For convenience, in FIGS. 9A and 9B, it is assumed that the other conditions except positions at which a touch input occurs, e.g., intensities of the touch input, and the like may be the substantially the same.

Referring to FIG. 9A, when a touch input occurs in an intermediate area within a unit sensor 310, the variation dCm in capacitance corresponding to the touch input is relatively large.

On the other hand, referring to FIG. 9B, when a touch input occurs in a boundary area between unit sensors 310, the variation dCm in capacitance corresponding to the touch input is relatively small. If the variation dCm in capacitance corresponding to the touch input is not sufficient, it is difficult to accurately detect a touch input. This may be one of factors that cause degradation of touch sensitivity.

Figure 10:
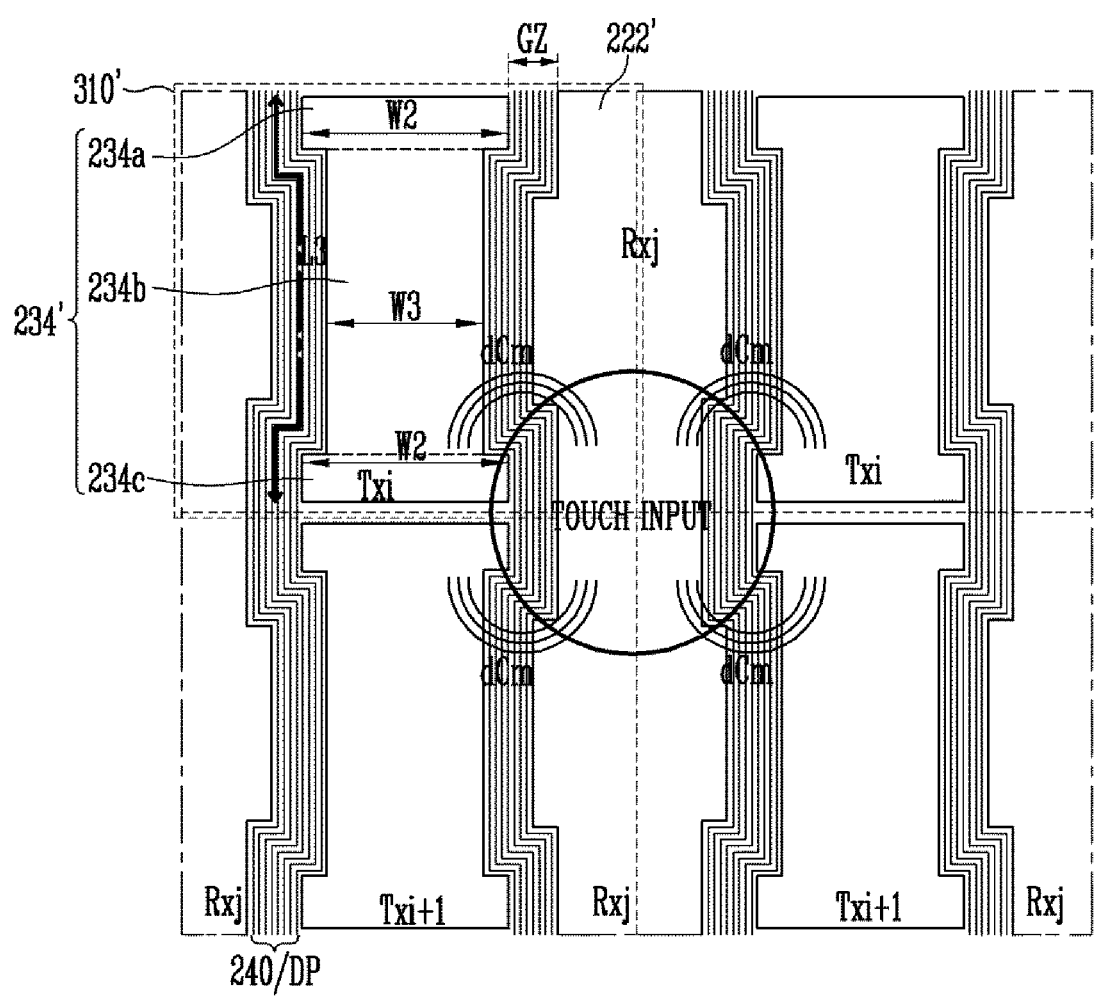
FIG. 10 is a plan view of a first embodiment of sensor electrodes constructed according to the principles of the invention.

FIG. 10 is a plan view of a first embodiment of sensor electrodes constructed according to the principles of the invention. The sensor electrodes shown in FIG. 10 may be applied to at least a partial area in the entire sensing area.

Referring to FIG. 10, each of second sensor electrodes Txi and Txi+1 (234') have different widths that vary along the longitudinal axis of the electrode. For example, in each of the second sensor electrodes Txi and Txi+1 (234'), the width (hereinafter, referred to as a second width) W2 of each of first and second end parts (e.g., upper and lower parts) 234*a* and 234*c* opposite to each other is larger than the width (hereinafter, referred to as a third width) W3 of an intermediate area 234b between the first and second end parts 234a and 234c. In this particular example, each of the second sensor electrodes Txi and Txi+1 (234') may be formed in an "I" shape.

Thus, the second widths W2 of the first and second end parts 234a and 234c of each of the second sensor electrodes Txi and Txi+1 (234') may be the same. However, the inventive concepts are not limited thereto. For example, the first and second end parts 234a and 234c of each of the second sensor electrodes Txi and Txi+1 (234') may have widths different from each other, and the widths may vary continuously or discretely along the entire length or just in sections of the electrode.

First sensor electrodes Rxj (222') may be spaced apart from adjacent second sensor electrodes Txi and Txi+1 (234') at a predetermined distance along boundary surfaces of the adjacent second sensor electrodes Txi and Txi+1 (234'). In this case, the first sensor electrodes Rxj (222') may have shapes corresponding or complementary to the second sensor electrodes Txi and Txi+1 (234').

Lines 240 and/or dummy patterns DP, which are disposed between the first and second sensor electrodes Rxj, Txi, and Txi+1 (222' and 234'), may also be spaced apart from the boundary surface at a predetermined distance along boundary surface shapes of the first and second sensor electrodes Rxj, Txi, and Txi+1 (222' and 234').

The second width W2 of each of the second sensor electrodes Txi and Txi+1 (234') may be expanded as compared with the first width W1 of FIG. 6 in boundaries of unit sensors 310', e.g., the first and second end parts 234a and 234c, and the third width W in the remaining area of each of the second sensor electrodes Txi and Txi+1 (234'), e.g., the intermediate area 234b may be decreased as compared with the first width W1. However, the inventive concepts are not limited thereto. For example, the width W3 in the intermediate area 234b of each of the second sensor electrodes Txi and Txi+1 (234') may be equal to the first width W1.

According to the above-described embodiment, the length L3 in which capacitance used in detection of a touch input is lengthened in each unit sensor 310', and the variation in capacitance, caused by the touch input at a boundary of the unit sensors 310', is increased. To be specific, as the length L3 is lengthened, the dummy patterns DP disposed in the gray zone GZ may be also lengthened so that an area of the dummy patterns DP may be enlarged. Accordingly, the touch sensitivity can be improved.

Figure 11:
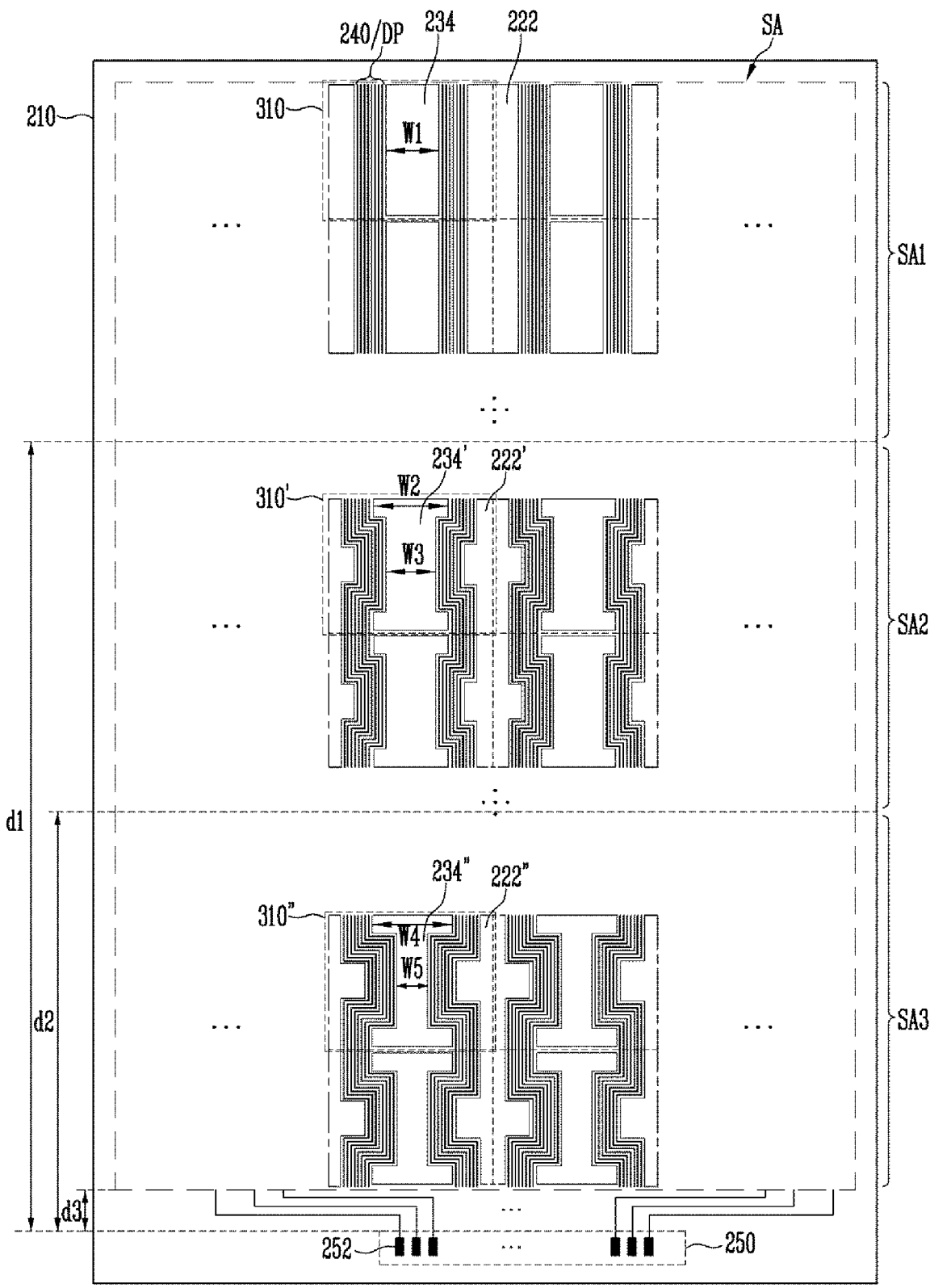
FIG. 11 is a plan view of an embodiment of a touch sensor including the sensor electrodes shown in FIG. 10.

FIG. 11 is a plan view of an embodiment of a touch sensor including the sensor electrodes shown in FIG. 10. Particularly, FIG. 11 illustrates a touch sensor in which the sensor electrodes according to the embodiment of FIG. 10 are provided in at least one area of a sensing area. In FIG. 11, components identical or similar to those of one or more of the above-described embodiments are designated by like reference numerals, and their detailed descriptions are omitted to avoid redundancy.

Referring to FIG. 11, sensing area SA is divided into a plurality of areas according to their distance from a pad unit 250. For example, the sensing area SA may include a first area SA1 spaced apart by a first distance d1 from the pad unit 250 and a second area SA2 spaced apart by a second distance closer than the first distance d1 from the pad unit 250. In addition, the sensing area SA may further include a third area SA3 spaced apart by a third distance d3 closer than the second distance d2 from the pad unit 250. For convenience, in FIG. 11, the sensing area SA is divided in three areas according to distances from the pad unit 250, but the inventive concepts are not limited thereto. For example, the sensing area SA may be divided into only two areas, or may be divided into four or more areas.

The first area SA1 includes unit sensors 310 disposed in an uppermost area (e.g., a far end), and the third area SA3 includes unit sensors 310" disposed in a lowermost area (e.g., a near end). In some embodiments, sizes of the first and third areas SA1 and SA3 may be variously changed. That is, the first and third areas SA1 and SA3 include unit sensors 310 and 310" on one or more rows, respectively, and the number of each of the unit sensors 310 and 310" respectively included in the first and third areas SA1 and SA3 may be changed.

The second area SA2 includes unit sensors 310' disposed between the first and third areas SA1 and SA3. In one or more exemplary embodiments, the second area SA2 may be divided into a plurality of sub-areas.

As described in FIG. 3, when compared with the second and third areas SA2 and SA3, a relatively small number of lines 240 and a relatively large number of dummy patterns DP are disposed between first and second sensor electrodes 222 and 234 in the first area SA1. Thus, capacitance between adjacent first and second sensor electrodes 222 and 234 can be sufficiently generated in the first area SA1, and it is advantageous to generate a capacitance sufficient enough to detect a touch input event at a boundary between the unit sensors 310. However, since the first area SA1 is distant from the pad unit 250, lengths of the lines 240 connected to the first and second sensor electrodes 222 and 234 in the first area SA1 are lengthened, and therefore, line loads of the lines 240 are relatively large.

On the other hand, when compared with the first and second areas SA1 and SA2, a relatively large number of lines 240 and a relatively small number of dummy patterns DP are disposed between first and second sensor electrodes 222" and 234" in the third area SA3. Therefore, capacitance between adjacent first and second sensor electrodes 222" and 234" is relatively small in the third area SA3. Particularly, it is difficult to generate a capacitance sufficient enough to detect a touch input at a weak point such as a boundary between the unit sensors 310". However, since the third area SA3 is close to the pad unit 250, lengths of the lines 240 connected to the first and second sensor electrodes 222" and 234" in the third area SA3 are short, and therefore, line loads of the lines 240 are relatively small.

Accordingly, in this exemplary embodiment, a touch sensor is provided that is capable of improving touch sensitivity, by considering characteristics between the areas SA1, SA2, and SA3.

In this regard, the shapes and/or sizes of the second sensor electrodes 234, 234', and 234" in the respective divided areas of the sensing area SA, e.g., the first, second, and third areas SA1, SA2, and SA3 may be different. For example, at least one of the shapes of the second sensor electrodes 234, 234', and 234" and/or the maximum widths W1, W2, and W3 of first and second end parts in the respective first, second, and third areas SA1, SA2, and SA3 may be different. In addition, the shapes and/or sizes of the first sensor electrodes 222, 222', and 222" may be changed as the shapes and/or sizes of the second sensor electrodes 234, 234', and 234" are changed.

For example, each of the second sensor electrodes 234 disposed in the first area SA1 may have a predetermined first width W1. In addition, each of the second sensor electrodes 234' disposed in the second area SA2 may have a second width W2 greater than the first width W1 at at least first and second end parts (e.g., upper and lower ends) thereof.

Each of the second sensor electrodes 234' disposed in the second area SA2 may have a third width W3 smaller than the first width W1 and the second width W2 in at least one area (e.g., an intermediate area) between the first and second end parts. That is, in some embodiments, when compared with the second sensor electrodes 234 in the first area SA1, the width of each of the second sensor electrodes 234' in the second area SA2 may be increased to the second width W2 at the first and second end parts, and may be decreased to the third width W3 in the intermediate area. In this case, areas of the second sensor electrodes 234 in the first area SA1 and the second sensor electrodes 234' in the second area SA2 may be similar to each other, or may be maintained to be substantially equal to each other. However, the inventive concepts are not limited thereto. As another example, the second sensor electrodes 234' in the second area SA2 may extend in the width direction at only the first and second end parts, and may have the first width W1 in the remaining area, like the second sensor electrodes 234 in the first area SA1.

In addition, the shape and/or size of the second sensor electrodes 234' may also be gradually changed in the second area SA2. For example, the second sensor electrodes 234' in the second area SA2, which are disposed adjacent to the first area SA1, may have the substantially same shape and/or size as the second sensor electrodes 234 in the first area SA1. And, the second sensor electrodes 234' in the second area SA2, which are disposed adjacent to the third area SA3, may have the substantially same shape and/or size as the second sensor electrodes 234" in the third area SA3. The second sensor electrodes 234' disposed in the intermediate area of the second area SA2 may be gradually changed to have a similar shape to the second sensor electrodes 234" in the third area SA3 as being distant from the first area SA1.

Each of the second sensor electrodes 234" disposed in the third area SA3 may have a fourth width W4 greater than the second width W2 at at least first and second end parts (e.g., upper and lower parts). Also, in some embodiments, each of the second sensor electrodes 234" disposed in the third area SA3 may have a fifth width W5 smaller than the first and third width W1 and W3 in at least one area (e.g., an intermediate area) between the first and second end parts.

That is, in one or more exemplary embodiments, the difference between the maximum width W4 and the minimum width W5 of each of the second sensor electrodes 234" disposed in the third area SA3 among the second sensor electrodes 234, 234', and 234" disposed in the first, second, and third areas SA1, SA2, and SA3 may be largest. In this case, areas of the respective second sensor electrodes 234, 234', and 234" disposed in the first, second, and third areas SA1, SA2, and SA3 may be similar to one another, or may be substantially equal to one another.

According to the above-described embodiment, the shapes and/or sizes of the first sensor electrodes 222, 222', and 222" and the second sensor electrodes 234, 234', and 234" are gradually changed in the respective areas SA1, SA2, and SA3, which have been segregated based upon their distances from the pad unit 250. Accordingly, the touch sensitivity can be improved.

Figure 12:
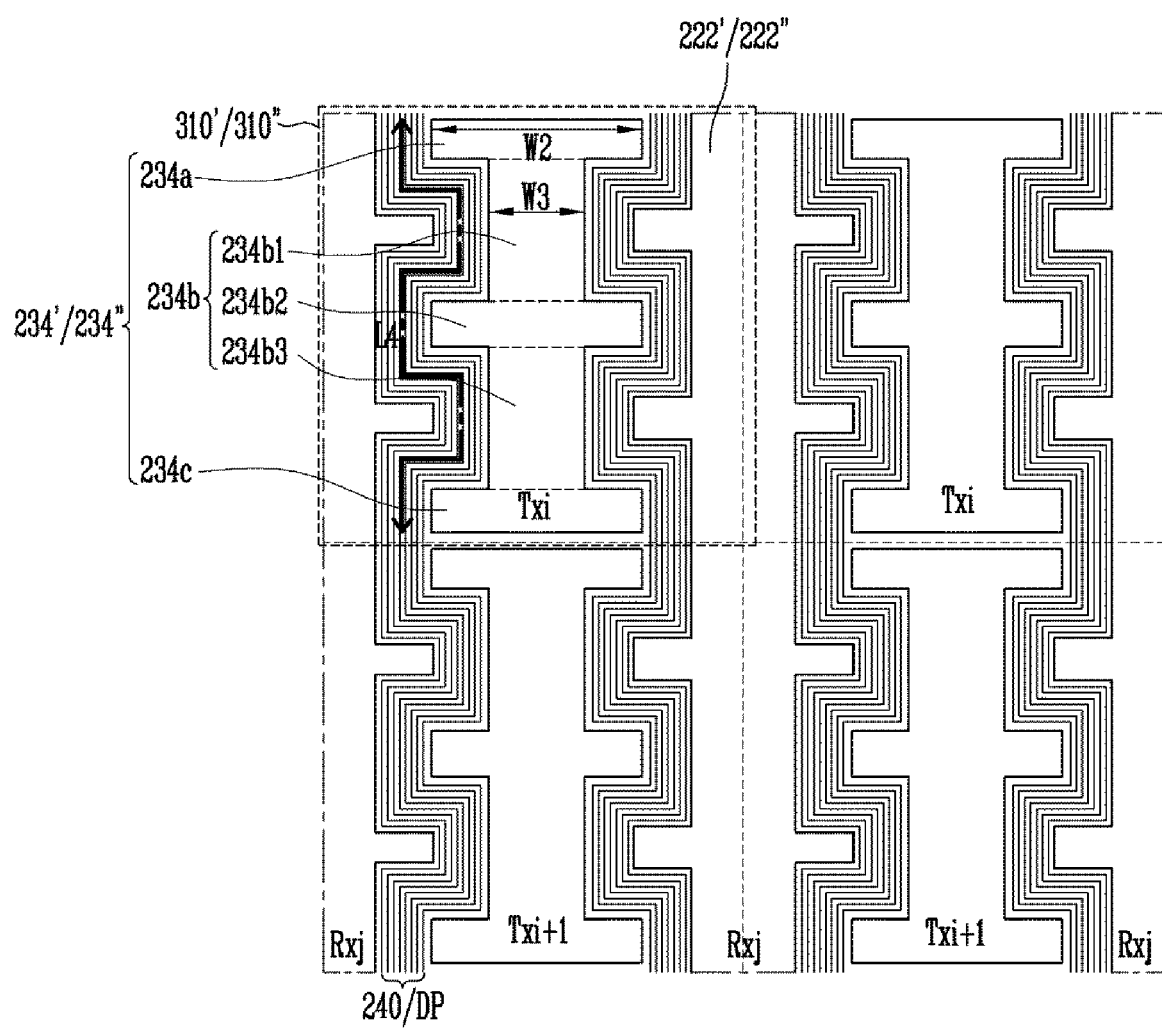
FIG. 12 is a plan view of a second embodiment of sensor electrodes constructed according to the principles of the invention.

FIG. 12 is a plan view of a second embodiment of sensor electrodes constructed according to the principles of the invention. In FIG. 12, components identical or similar to those of one or more of the above-described embodiments are designated by like reference numerals, and their detailed descriptions are omitted to avoid redundancy.

Referring to FIG. 12, in each of the second sensor electrodes 234' and 234" disposed in at least one area of the sensing area SA, e.g., the second area SA2 and/or the third area SA3 of FIG. 11, an intermediate area 234b between first and second end parts 234a and 234c may be divided into at least three intermediate areas 234b1, 234b2, and 234b3. In some embodiments, each of the second sensors 234' and 234" disposed in the second and third areas SA2 and SA3 may have the third width W3 in at least two regions 234b1 and 234b3 adjacent to the first and second end parts 234a and 234c, and may have the second width W2 in at least one area in the remaining area 234b2. That is, the shapes and/or sizes of the second sensors 234' and 234" disposed in at least one area of the sensing area SA may be variously changed.

According to the above-described embodiment, as compared with the embodiment shown in FIG. 10, the length L4 in which capacitance used in detection of a touch input is formed is lengthened, and a variation dCm in capacitance corresponding to the touch input at a point (e.g., a minimum point of dCm), such as a boundary of the unit sensors 310' and 310", at which the variation dCm in capacitance corresponding to the touch input is relatively small, may be increased. In addition, as compared with the embodiment shown in FIG. 10, the sensitivity in the intermediate area 234b of the unit sensors 310' and 310" can be enhanced. Accordingly, the touch sensitivity can be improved.

Figure 13:
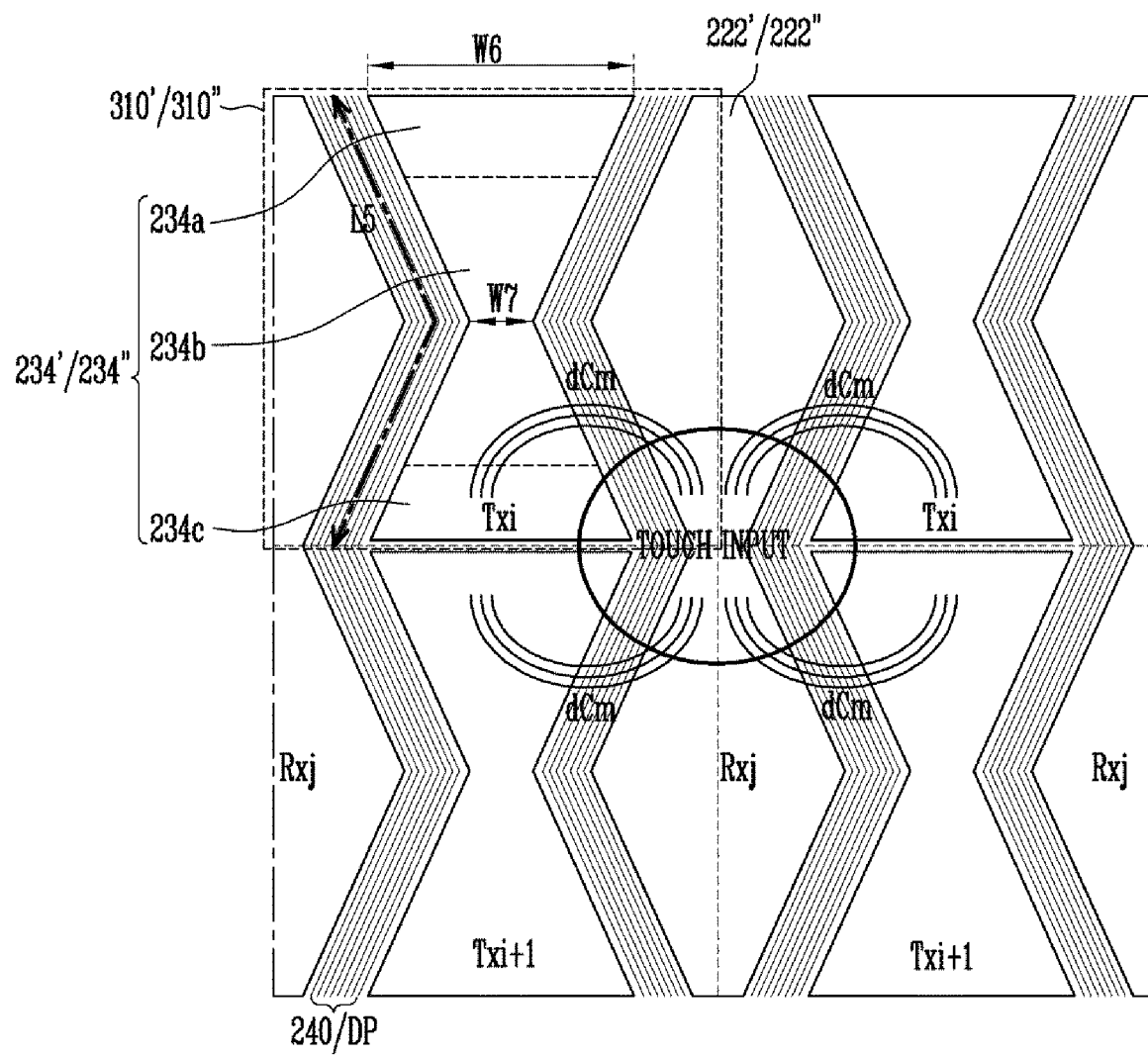
FIG. 13 is a plan view of a third embodiment of sensor electrodes constructed according to the principles of the invention.

FIG. 13 is a plan view of a third embodiment of sensor electrodes constructed according to the principles of the invention. In FIG. 13, components identical or similar to those of one or more of the above-described embodiments are designated by like reference numerals, and their detailed descriptions are omitted to avoid redundancy.

Referring to FIG. 13, each of the second sensors 234' and 234" disposed in at least one area of the sensing area SA, e.g., the second area SA2 and/or the third area SA3 may have a seventh width W7 smaller than the first width W1 in one area between the first and second end parts 234a and 234c, and may be formed to have a width that gradually increases along the length of the electrode progressing from the middle area having the seventh width W7 to each of the first and second end parts 234a and 234c. For example, each of the second sensors 234' and 234" may be designed in a hourglass shape having a width gradually increasing in a direction approaching each of the first and second end parts 234a and 234c from a central part thereof.

According to the above-described embodiment, as compared with the embodiment shown in FIG. 6, a length L5 in which capacitance used in detection of a touch input is formed is lengthened, and a variation dCm in capacitance corresponding to the touch input at a point at which the variation dCm in capacitance corresponding to the touch input is relatively small may be increased. Accordingly, the touch sensitivity can be improved.

Figure 14:
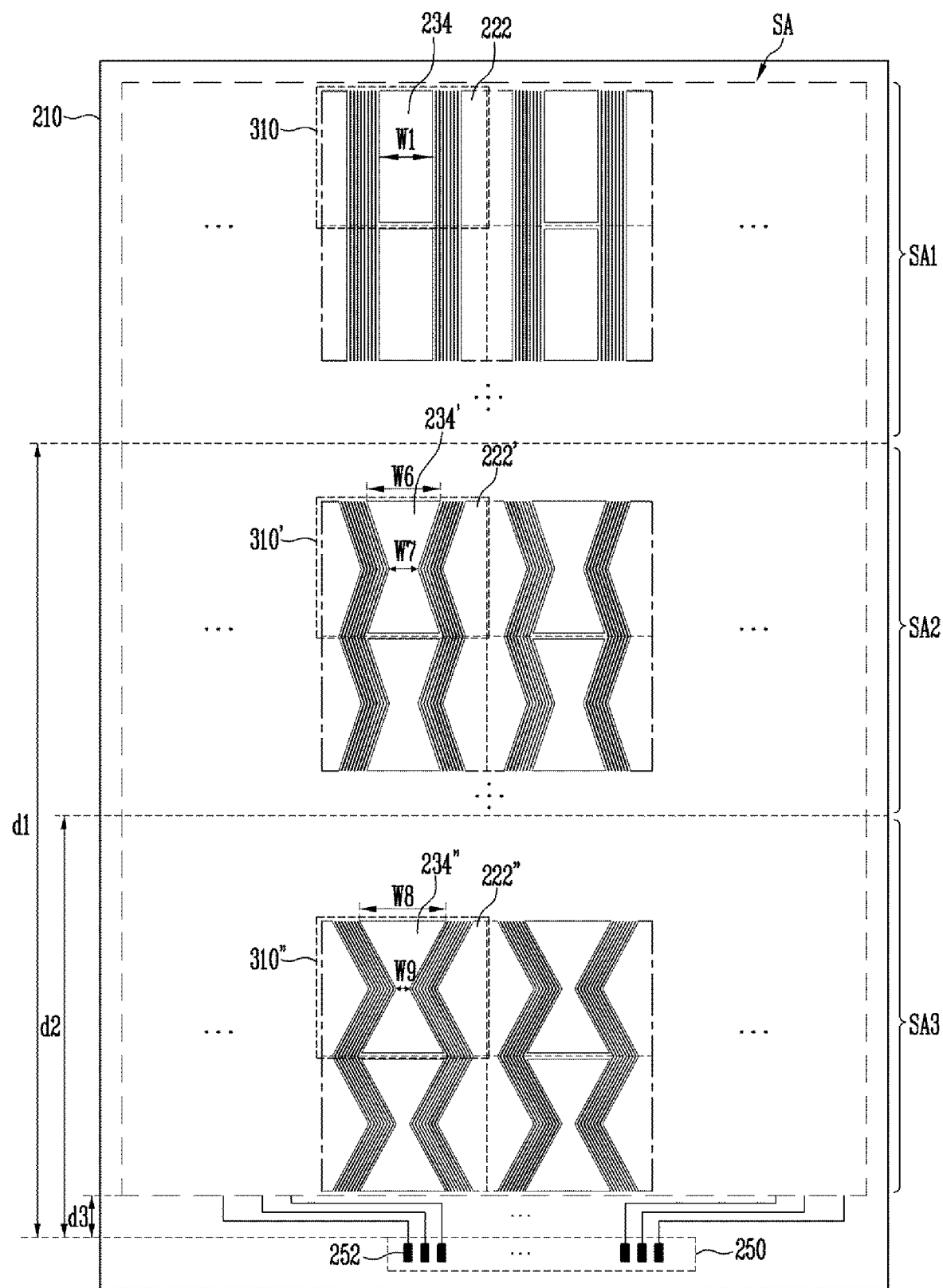
FIG. 14 is a plan view of an embodiment of a touch sensor including the sensor electrodes shown in FIG. 13.

FIG. 14 is a plan view of an embodiment of a touch sensor including the sensor electrodes shown in FIG. 13. Particularly, FIG. 14 illustrates a touch sensor including the sensor electrodes according to the embodiment of FIG. 13 in at least one area of a sensing area. In FIG. 14, components identical or similar to those of one or more of the above-described embodiments are designated by like reference numerals, and their detailed descriptions are omitted to avoid redundancy.

Referring to FIG. 14, a sensing area SA is divided into a plurality of areas according to distances from a pad unit 250. For example, the sensing area SA may be divided into a first area SA1, a second area SA2, and a third area SA3.

In one or more exemplary embodiments, the shapes and/or sizes of second sensor electrodes 234, 234', and 234" in the respective first, second, and third areas SA1, SA2, and SA3 may be different. For example, at least one of the shapes of the second sensor electrodes 234, 234', and 234" and/or the maximum widths W1, W6, and W8 of first and second end parts in the respective first, second, and third areas SA1, SA2, and SA3 may be different. In addition, the shapes and/or sizes of first sensor electrodes 222, 222', and 222" may be changed as the shapes and/or sizes of the second sensor electrodes 234, 234', and 234" are changed.

For example, each of second sensor electrodes 234 disposed in the first area SA1 may have a predetermined first width W1. In addition, each of the second sensor electrodes 234' and 234" disposed in the second and third areas SA2 and SA3 may be formed to basically have the same shape as the second sensor electrodes 234' and 234" according to the embodiment of FIG. 13.

However, the second sensor electrodes 234' and 234" disposed in the second and third areas SA2 and SA3 may have different maximum widths W6 and W8 and/or different minimum widths W7 and W9. For example, the maximum width W8 of the second sensor electrodes 234" in the third area SA3 may be greater than that W6 of the second sensor electrodes 234' in the second area SA2, and the minimum width W9 of the second sensor electrodes 234" in the third area SA3 may be smaller than that W7 of the second sensor electrodes 234' in the second area SA2.

According to the above-described embodiment, the shapes and/or sizes of the first sensor electrodes 222, 222', and 222" and the second sensor electrodes 234, 234', and 234" are gradually changed in the respective areas SA1, SA2, and SA3 based upon distances from the pad unit 250. Accordingly, the touch sensitivity can be improved.

Figure 15:
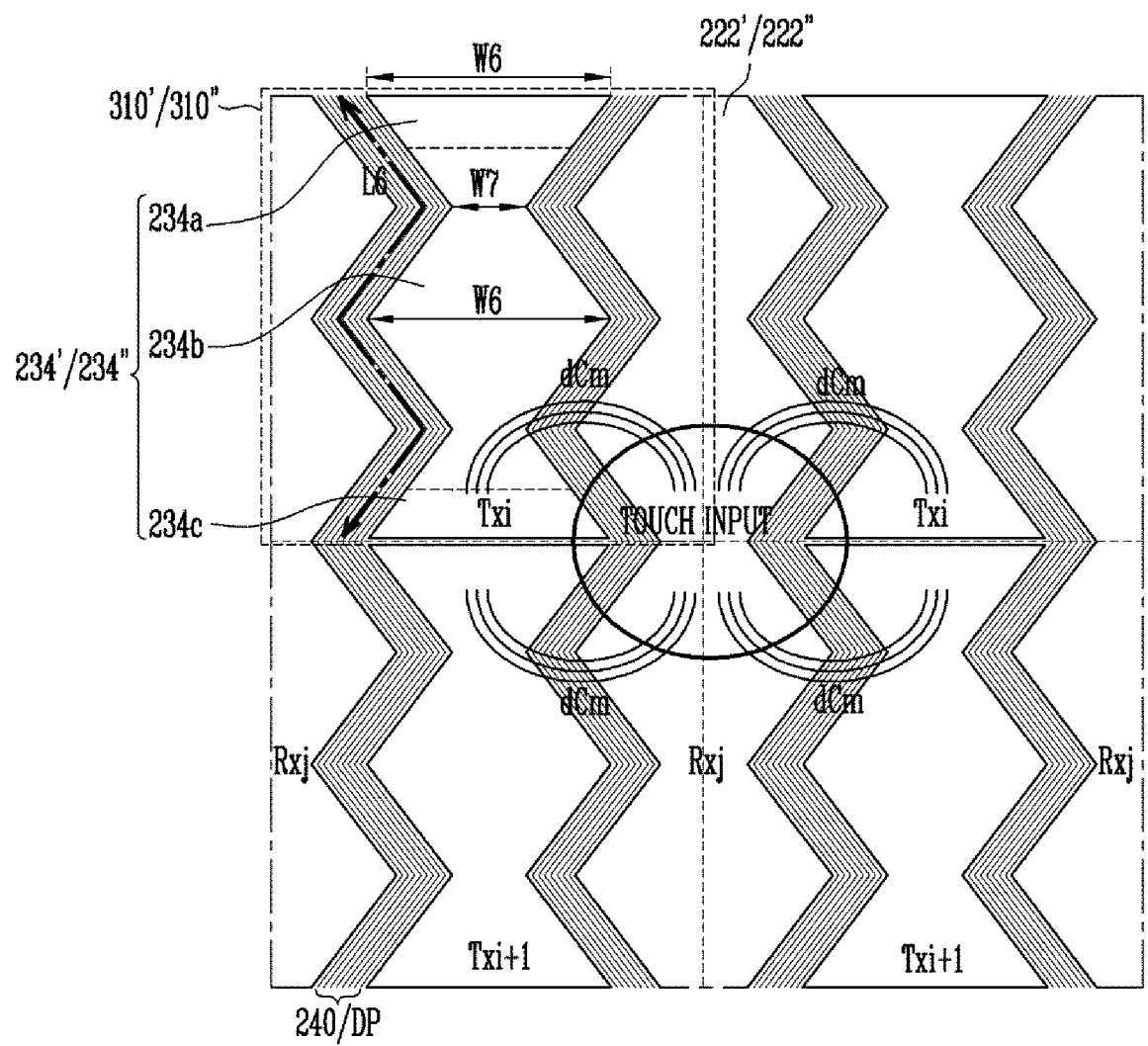
FIG. 15 is a plan view of a fourth embodiment of sensor electrodes constructed according to the principles of the invention.

FIG. 15 is a plan view of a fourth embodiment of sensor electrodes constructed according to the principles of the invention. In FIG. 15, components identical or similar to those of one or more of the above-described embodiments are designated by like reference numerals, and their detailed descriptions are omitted to avoid redundancy.

Referring to FIG. 15, in each of the second sensor electrodes 234' and 234" disposed in at least one area of the sensing area SA, e.g., the second area SA2 and/or the third area SA3 of FIG. 14, the number of sections having the minimum width W7 is increased to two. In some embodiments, the number of sections having the minimum width W7 in each of the second sensors 234' and 234" may be changed to three or more.

In addition, at least one of the maximum width W6 and the minimum width W7 of each of the second sensor electrodes 234' and 234" may be changed. For example, at least one of the maximum widths W6 and W8 and the minimum widths W7 and W9 of the second sensor electrodes 234' and 234" disposed in the second area SA2 and the third area SA3 may be different. As an example, the shapes and/or sizes of the second sensor electrodes 234' and 234" may be gradually changed progressing to the first to third areas SA1, SA2, and SA3. If the shapes and/or sizes of the second sensor electrodes 234' and 234" are changed, the shapes and/or sizes of the first sensor electrodes 222' and 222" are changed corresponding to the change in shapes and/or sizes of the second sensor electrodes 234' and 234".

According to the above-described embodiment, as compared with the embodiment shown in FIG. 13, a length L6 in which a capacitance used in detection of a touch input is formed is lengthened, and a variation dCm in capacitance corresponding to the touch input at a point at which the variation dCm in capacitance corresponding to the touch input is relatively small may be increased. In addition, as compared with the embodiment shown in FIG. 13, the sensitivity in the intermediate area 234b of the unit sensors 310' and 310" can be reinforced. Accordingly, the touch sensitivity can be improved.

Figure 16:
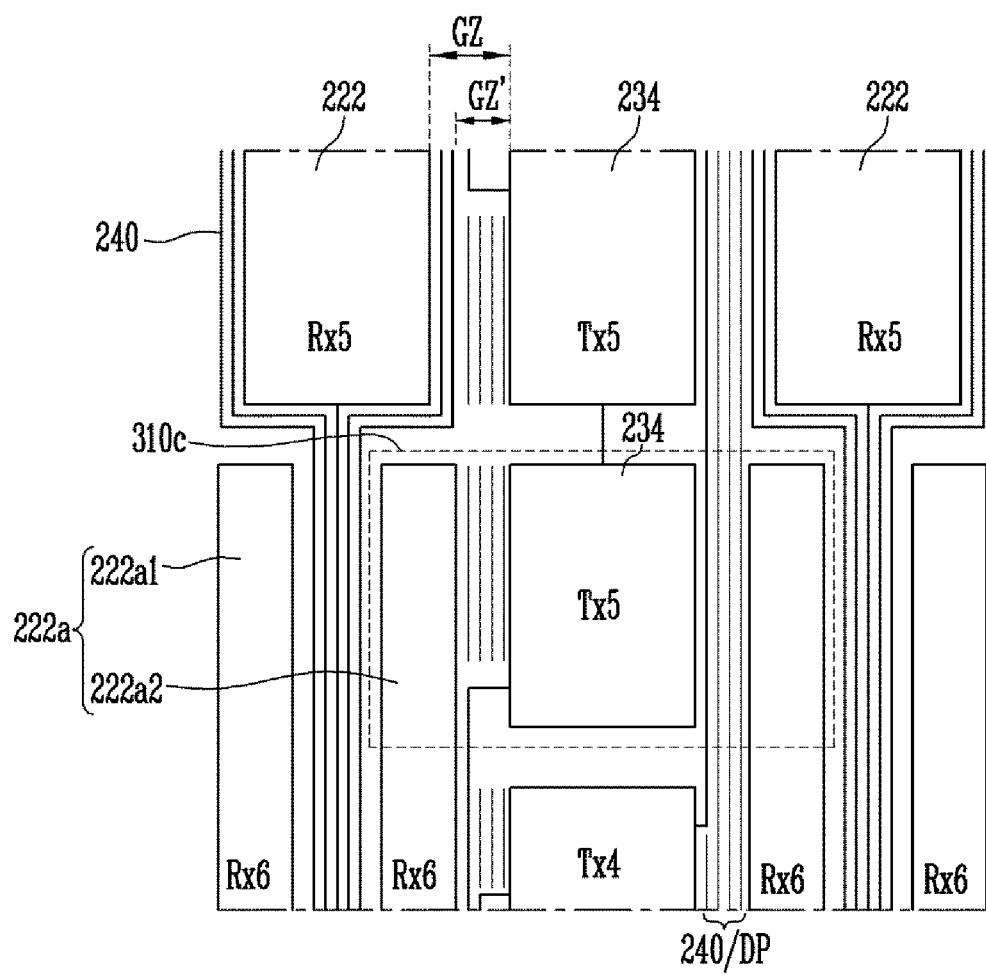
FIG. 16 is a plan view illustrating a fifth embodiment of sensor electrodes constructed according to the principles of the invention.
Figure 17:
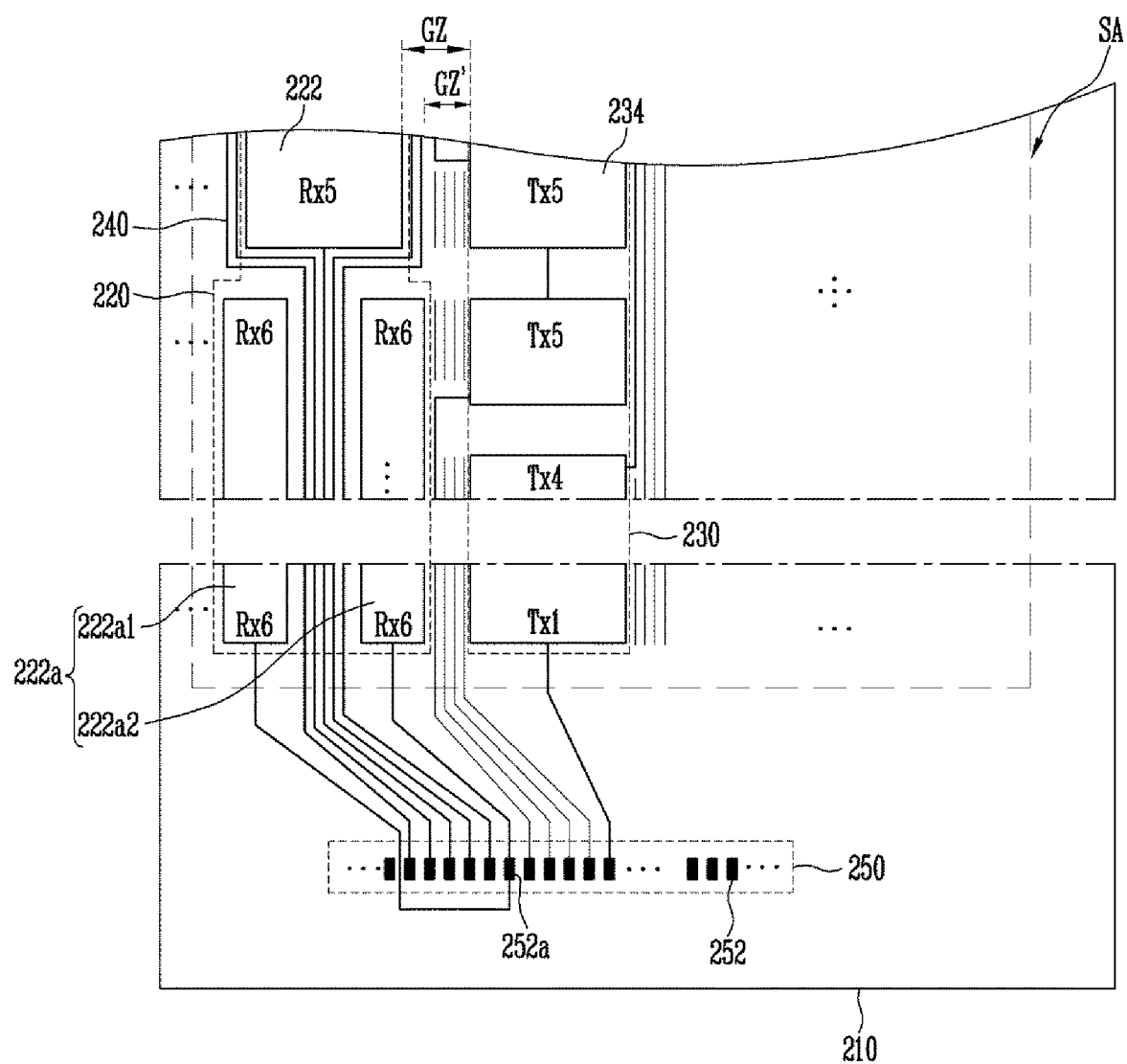
FIG. 17 is a plan view illustrating an embodiment of a connection structure of the sensor electrodes shown in FIG. 16 and a pad unit constructed according to the principles of the invention.

FIG. 16 is a plan view illustrating a fifth embodiment of sensor electrodes constructed according to the principles of the invention. FIG. 17 is a plan view illustrating an embodiment of a connection structure of the sensor electrodes shown in FIG. 16 and the pad unit constructed according to the principles of the invention. In FIGS. 16 and 17, components identical or similar to those of one or more of the above-described embodiments are designated by like reference numerals, and their detailed descriptions are omitted to avoid redundancy.

Referring to FIGS. 16 and 17, each of first sensor electrodes 222a disposed in at least one area of the sensor area SA is divided into at least two sub-electrodes 222a1 and 222a2. In addition, at least some of lines 240 are connected to the pad unit 250 via an area between the at least two sub-electrodes 222a1 and 222a2.

For example, each of first sensor electrodes 222a disposed in a lowermost area that is at least a near end closest to the pad unit 250 among the first sensor electrodes 222 and 222a disposed in the sensing area SA may be divided into two sub-electrodes 222a1 and 222a2. For convenience, in this embodiment, it is assumed that hexanary first sensor electrodes Rx6 (222a) are the first sensor electrodes 222a disposed in the lowermost area of the sensor area SA.

In one or more exemplary embodiments, at least some of the lines 240, e.g., lines 240 connected to primary to quinternary first sensor electrodes 222 disposed above the sub-electrodes 222a1 and 222a2 may be routed to pass through an area between the divided sub-electrodes 222a1 and 222a2. In addition, the lines 240 connected to the second sensor electrodes 234 may be routed to pass through gray zones GZ and GZ' between the first sensor electrodes 222 and 222a and the second sensor electrodes 234.

According to the above-described embodiment, in the area in which the first sensor electrodes Rx6 (222a) divided into a plurality of sub-electrodes 222a1 and 222a2 in the sensor area SA, the gray zone GZ' between adjacent first and second sensor electrodes 222a and 234 becomes narrower than the gray zone GZ in the remaining sensor area SA. That is, the widths of the gray zones GZ and GZ' between the first sensor electrode columns 220 and the second sensor electrode columns 230 are partially narrowed in the area in which at least the sub-electrodes 222a1 and 222a2 are disposed.

Accordingly, in the area in which the first sensor electrodes Rx6 (222a) divided into a plurality of sub-electrodes 222a1 and 222a2, the distance between the adjacent first and second sensor electrodes 222a and 234 is shortened.

Thus, capacitance Cm between the adjacent first and second sensor electrodes 222a and 234 and variation dCm in capacitance corresponding to a touch input can be sufficiently secured even in a lower area in which a relatively large number of lines 240 are disposed in the gray zones GZ and GZ'. Accordingly, the touch sensitivity can be improved.

In one or more exemplary embodiments, the sub-electrodes 222a1 and 222a2 included in the same sensor electrode column among the first sensor electrode columns 220 may be connected to the same one pad 252a provided in the pad unit 250. For example, at least one of the sub-electrodes 222a1 and 222a2 may be connected to a corresponding pad 252a to pass through a lower area (e.g., an area between the pad unit 250 and a lower edge of the substrate 210) at the outside of the pad unit 250. In this case, the sub-electrodes 222a1 and 222a2 can be stably connected to the pad unit 250 while the number of pads 252 and 252a is identically maintained.

Meanwhile, the structure of the embodiment shown in FIGS. 16 and 17 may be applied to or combined with at least one of the embodiments described with reference to FIGS. 2 to 15, or may be independently used. For example, in at least one of the embodiments of FIGS. 2 to 15, each of the first sensor electrodes 222, 222', and 222" in at least a lowermost area (e.g., a near end) may be divided into at least two sub-electrodes 222a1 and 222a2 as shown in FIGS. 16 and 17, and at least some lines 240 may be routed to pass through an area between the sub-electrodes 222a1 and 222a2. That is, one of the embodiments described with reference to FIGS. 2 to 17 may be used alone, or characteristic configurations or select components of at least two of the embodiments may be combined with each other, thereby improving the touch sensitivity.

According to the touch sensors constructed according to the principles of the invention, it is possible to provide a touch sensor having improved sensitivity while reducing manufacturing costs.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A touch sensor comprising:
a plurality of first sensor electrode columns disposed in a first direction in a sensing area, the plurality of first sensor electrode columns each including N (N is a natural number of 2 or more) first sensor electrodes;
a plurality of second sensor electrode columns alternately disposed with the first sensor electrode columns in the sensing area, the plurality of second sensor electrode columns each including a plurality of second sensor electrodes;
a plurality of lines disposed between the first sensor electrode columns and the second sensor electrode columns; and
a pad unit including a plurality of pads connected to the lines,
wherein each of Nth first sensor electrodes closest to the pad unit among the first sensor electrodes provided in each of the first sensor electrode columns comprises at least two sub-electrodes, and at least some of the lines are connected to the pad unit passing through an area between the at least two sub-electrodes.

* * * * *